United States Patent
Mizoe et al.

(10) Patent No.: US 8,219,548 B2
(45) Date of Patent: Jul. 10, 2012

(54) DATA PROCESSING METHOD AND DATA ANALYSIS APPARATUS

(75) Inventors: Akihito Mizoe, Yokohama (JP); Hitoshi Mizutani, Yokohama (JP); Atsushi Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 978 days.

(21) Appl. No.: 11/851,457

(22) Filed: Sep. 7, 2007

(65) Prior Publication Data

US 2008/0133973 A1    Jun. 5, 2008

(30) Foreign Application Priority Data

Nov. 27, 2006    (JP) .................... 2006-318739

(51) Int. Cl.
   G06F 17/30    (2006.01)
   G06F 11/34    (2006.01)

(52) U.S. Cl. .......................... 707/721; 714/37

(58) Field of Classification Search ............. None
   See application file for complete search history.

(56) References Cited

U.S. PATENT DOCUMENTS

| | | | |
|---|---|---|---|
| 6,041,425 A | 3/2000 | Kokunishi et al. | |
| 7,043,403 B1 * | 5/2006 | Wang et al. | 702/185 |
| 2003/0144810 A1 * | 7/2003 | Tabor | 702/108 |
| 2003/0236652 A1 * | 12/2003 | Scherrer et al. | 703/2 |
| 2004/0039968 A1 * | 2/2004 | Hatonen et al. | 714/39 |
| 2006/0101413 A1 | 5/2006 | Kinno et al. | |
| 2006/0294095 A1 * | 12/2006 | Berk et al. | 707/6 |

FOREIGN PATENT DOCUMENTS

| | | |
|---|---|---|
| JP | 6-282464 A | 10/1994 |
| JP | 06-309584 | 11/1994 |
| JP | 07-056890 | 3/1995 |
| JP | 10-78894 A | 3/1998 |
| JP | 2001-331354 | 11/2001 |
| JP | 2004-348359 A | 12/2004 |
| JP | 2006-53788 A | 2/2006 |

* cited by examiner

*Primary Examiner* — Sathyanarayan Pannala
*Assistant Examiner* — Dinku Gebresenbet
(74) *Attorney, Agent, or Firm* — Mattingly & Malur, PC

(57) ABSTRACT

The execution of a process is analyzed by a data processing method using a data analysis device for processing a job by combining the processes of transforming input data and generating output data. The execution history of the process is recorded, and each time the process is executed, it is determined whether the process execution has a high anomaly probability based on a predetermined determination indicator. Upon determining that the process execution has a high anomaly probability, the process log information of the process including the determination indicator is recorded, and based on the process log information and the process execution history, the process with the high anomaly probability is further analyzed. By determining whether the process is anomalous or not, the process history analysis information including the analysis result and the execution history of the process to be analyzed is generated.

6 Claims, 24 Drawing Sheets

FIG. 5

PROCESS STEP TABLE 181

| PROCESS NAME | OUTPUT DESTINATION | INPUT SOURCE | |
|---|---|---|---|
| PROCESS 1 | DATA A | DATA B, D, F | ~504 |
| PROCESS 2 | DATA B | DATA C | |
| PROCESS 3 | DATA D | DATA E | |
| PROCESS 4 | DATA F | DATA G | |
| ... | ... | ... | |

THRESHOLD VALUE TABLE                                                          182

| PROCESS NAME | DATA NAME | DETERMINATION INDICATOR | AVERAGE VALUE | MINIMUM VALUE | MAXIMUM VALUE | |
|---|---|---|---|---|---|---|
| PROCESS 1 | TABLE-A PROFIT/LOSS RATIO | DATA VALUE | 96.5 | 0.8 | 1.2 | ~707 |
| PROCESS 2 | TABLE-B UNIT SALES | DATA VALUE | 1232 | 900 | 1800 | ~708 |
| ... | ... | ... | ... | ... | ... | |
| 701 | 702 | 703 | 704 | 705 | 706 | |

FIG. 8

PROCESS LOG INFORMATION                          183

| PROCESS NAME | STARTING TIME | DETERMINATION INDICATOR | |
|---|---|---|---|
| PROCESS 1 | 2006/7/20 23:00 | DATA VALUE | ~804 |
| PROCESS 2 | 2006/7/20 21:30 | DATA VALUE | |
| PROCESS 2 | 2006/7/20 21:00 | PROCESSING TIME | |
| PROCESS 2 | 2006/7/20 20:00 | NUMBER OF EVENTS PROCESSED | |
| PROCESS 3 | 2006/7/20 3:00 | NUMBER OF TIMES EXECUTED | |
| ... | ... | ... | |
| 801 | 802 | 803 | |

FIG. 9

PROCESS HISTORY TABLE 184

| PROCESS NAME | STARTING TIME | END TIME | NUMBER OF EVENTS PROCESSED | PROCESS-ING TIME | NUMBER OF TIMES EXECUTED | |
|---|---|---|---|---|---|---|
| PROCESS 1 | 2006/7/20 23:00 | 2006/7/21 1:00 | 250 | 2:00 | 5 | ~907 |
| PROCESS 2 | 2006/7/20 22:00 | 2006/7/20 23:50 | 100 | 0:50 | 10 | |
| PROCESS 2 | 2006/7/20 21:30 | 2006/7/20 22:00 | 50 | 0:30 | 13 | |
| PROCESS 2 | 2006/7/20 21:00 | 2006/7/20 22:00 | 80 | 1:00 | 11 | |
| PROCESS 2 | 2006/7/20 20:00 | 2006/7/20 21:00 | 200 | 1:00 | 8 | |
| ... | ... | ... | ... | ... | ... | |
| 901 | 902 | 903 | 904 | 905 | 906 | |

| | | | 1403 |
|---|---|---|---|
| SALES PROFIT/LOSS RATIO BY BRANCH ▼ ~1402 | | | |

| BRANCH CODE | BRANCH NAME | AREA NAME | PROFIT/LOSS RATIO |
|---|---|---|---|
| S00045 | YOKOHAMA BRANCH | KANAGAWA | 97.2 |
| S00047 | KAWASAKI BRANCH | KANAGAWA | 96.8 |
| S00003 | SHINAGAWA BRANCH | TOKYO | 89.4 |
| S00005 | SHINBASHI BRANCH | TOKYO | 138.2 |

1404 ~ DATA VERIFICATION SCREEN DISPLAY

FIG. 15

DATA GENERATION TIME TABLE 177

| BLOCK ID | STARTING TIME |
|---|---|
| 001 | 2006/7/20 23:00 |
| 002 | 2006/7/20 18:00 |
| 003 | 2006/7/20 13:00 |
| 004 | 2006/7/20 8:00 |
| 005 | 2006/7/20 3:00 |
| ... | ... |

HISTORY ANALYSIS RESULT TABLE 178

| BLOCK ID | PROCESS NAME | STARTING TIME | END TIME | DETERMINATION RESULT | DETERMINATION INDICATOR |
|---|---|---|---|---|---|
| 001 | PROCESS 1 | 2006/7/20 23:00 | 2006/7/21 1:00 | DATA VALUE ANOMALY DETECTED | DATA VALUE |
| 001 | PROCESS 2 | 2006/7/20 22:00 | 2006/7/20 22:50 | NO PROBLEM | |
| 001 | PROCESS 2 | 2006/7/20 21:30 | 2006/7/20 22:00 | DATA VALUE ANOMALY DETECTED | DATA VALUE |
| 001 | PROCESS 2 | 2006/7/20 21:00 | 2006/7/20 22:00 | PROCESSING TIME ANOMALY DETECTED | PROCESSING TIME |
| 001 | PROCESS 2 | 2006/7/20 20:00 | 2006/7/20 21:00 | ANOMALY OF NUMBER OF EVENT PROCESSED DETECTED | NUMBER OF EVENTS PROCESSED |
| ... | ... | ... | ... | ... | ... |

1601  1602  1603  1604  1605  1606

1607 1608 1609

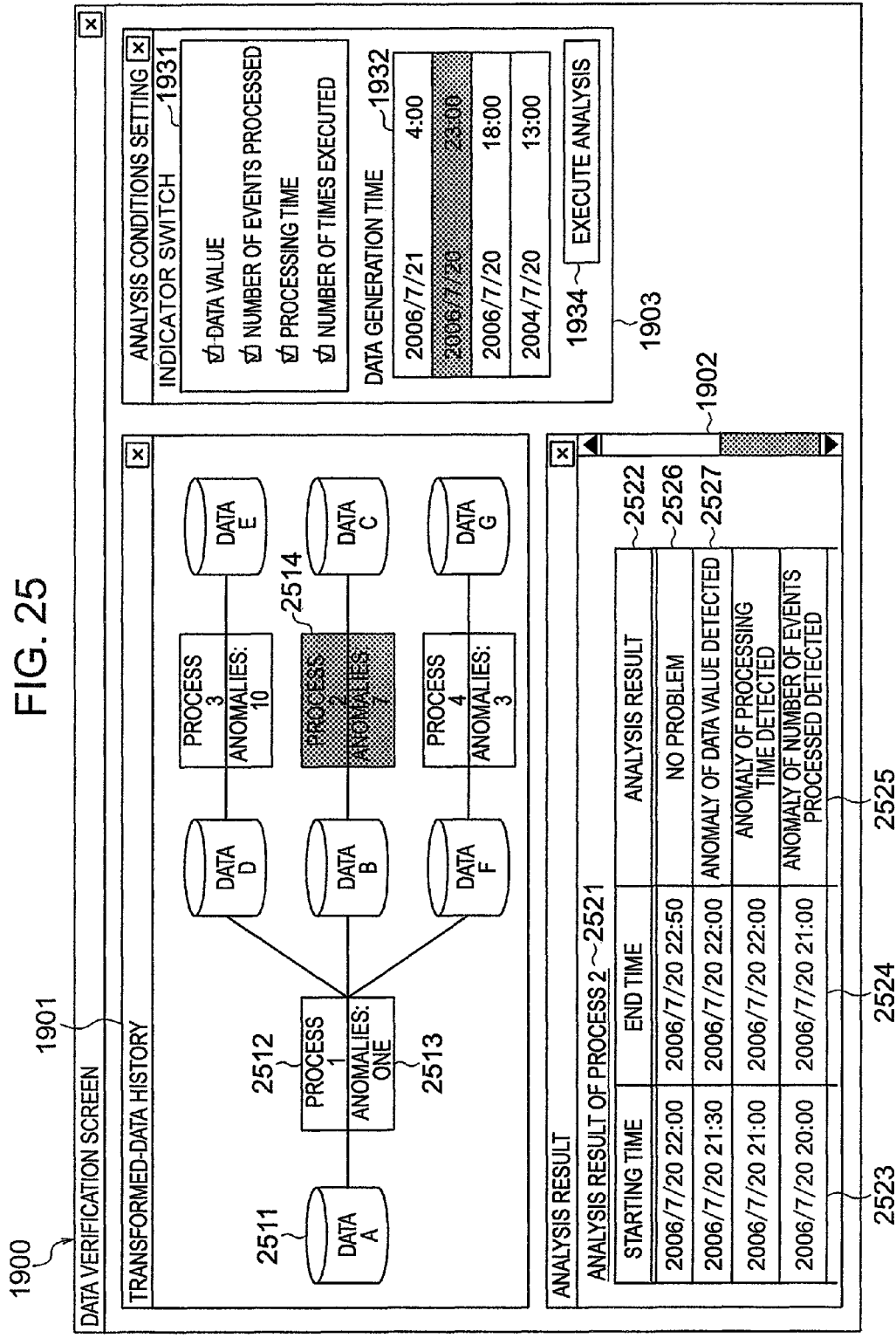

DATA PROCESSING METHOD AND DATA ANALYSIS APPARATUS

The present application claims priority from Japanese application JP2006-318739 filed on Nov. 27, 2006, the content of which is hereby incorporated by reference into this application.

BACKGROUND OF THE INVENTION

This invention relates to a data processing technique for transforming input data and generating output data, and in particular, to a technique for verifying whether the process of transforming the data is anomalous or not.

In a sales control system for a series of jobs including production to sales in a convenience store or the like, the data, such as the stock or the sales amount, input for each job are totalized and transformed at a data center or the like and utilized for stock control and sales control.

Upon detection of an anomaly in given transformed data, the user verifies the anomaly state and the cause thereof by referencing the log output from the system. The method available for aiding in the verification work includes a method which indicates a particular process whose execution has generated the data to be verified, a method in which the object to be verified is determined by identifying a particular data which has developed an anomaly, or a method in which the route leading to the process causing an anomaly and the data generated is specified.

JP-A-2001-331354 (Patent Document 1) discloses a technique for obtaining the history of transformed data (hereinafter sometimes referred to as the transformed-data history) as a hierarchical structure of the data and the process required for generation of an arbitrary data. Also, JP-A-7-56890 (Patent Document 2) discloses a technique for determining an anomaly or not of specified data such as the sales amount with high accuracy using statistical analysis. Further, JP-A-6-309584 (Patent Document 3) discloses a technique for specifying a route to the cause of an anomaly by scoring the process of generating the anomaly in such a field as a plant where candidates for an anomaly to be generated are known in advance.

SUMMARY OF THE INVENTION

The technique disclosed in Patent Document 1, however, poses the problem that in the case where the history of transformed data involves a large amount of information, the verification work including the identification of the process or the data developing an anomaly and the cause of the anomaly are difficult to carry out.

The technique disclosed in Patent Document 2, on the other hand, poses the problem that the method is effective for specified data such as the sales amount but not generally applicable to business data having a variety of types, which is difficult.

Further, the technique disclosed in Patent Document 3 poses the problem that the anomalies generated by the data such as the business data are varied, and therefore, in the case where the candidates for an anomaly are not known in advance, the scoring by the system is difficult and the route to the cause of the anomaly is difficult to specify.

Also, even in the case where a particular anomalous process or a particular anomalous data and the cause can be verified from the history of transformed data large in information amount, the logs of the history of process execution and the like are required to be verified, one by one, to determine the time of process execution or the time of generation of the data causing the anomaly, and the verification work requires a vast amount of time.

This invention has been achieved in view of the problems described above, and the object thereof is to provide a data processing method and a data analysis apparatus for determining whether a business data is anomalous by an indicator not dependent on the type of the business data thereby to analyze the related process, wherein the analysis result as to an anomaly or a normality is indicated for each process execution history and the history of transformed data by extracting only the process related to the anomaly thereby to aid the data verification work.

According to one typical aspect of the invention, there is provided, in a data analysis apparatus for analyzing the process execution for a business processed by executing a combination of processes of transforming an input data and generating an output data, a data processing method for analyzing the process execution, wherein the data analysis apparatus comprises a processor and a storage device accessible by the processor, and wherein the processor records the process execution history in the storage device, determines each time of process execution whether the process execution has a high anomaly probability or not based on a predefined determination indicator, records the process log information of the processes including the determination indicator upon determination that the process execution has a high anomaly probability, further analyzes the processes with a high anomaly probability and a series of processes required for generating the input data of the processes with the high anomaly probability based on the process log information and the process execution history while at the same time taking at least one of the process execution result, the temporal relation between the processes and the process execution timing into consideration, determines whether the execution of the analyzed processes is anomalous or not, and generates the process history analysis information including the analysis result and the execution history of the analyzed processes.

According to one aspect of the invention, the working time and amount required for the data verification work can be reduced by supporting the data verification work including the determination as to an anomaly and the identification of the cause of the anomaly.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing a process step table according to an embodiment of the invention.

FIG. 7 is a diagram showing a threshold value table according to an embodiment of the invention.

FIG. 8 is a diagram showing the process log information according to an embodiment of the invention.

FIG. 9 is a diagram showing a process history table according to an embodiment of the invention.

FIG. 14 is a diagram showing a screen for displaying the data generated by the process execution according to an embodiment of the invention.

FIG. 15 is a diagram showing a data generation time table according to an embodiment of the invention.

FIG. 16 is a diagram showing a history analysis result table according to an embodiment of the invention.

FIG. 25 is a diagram showing the data verification screen according to an embodiment of the invention.

DETAILED DESCRIPTION OF THE INVENTION

Figure 1:
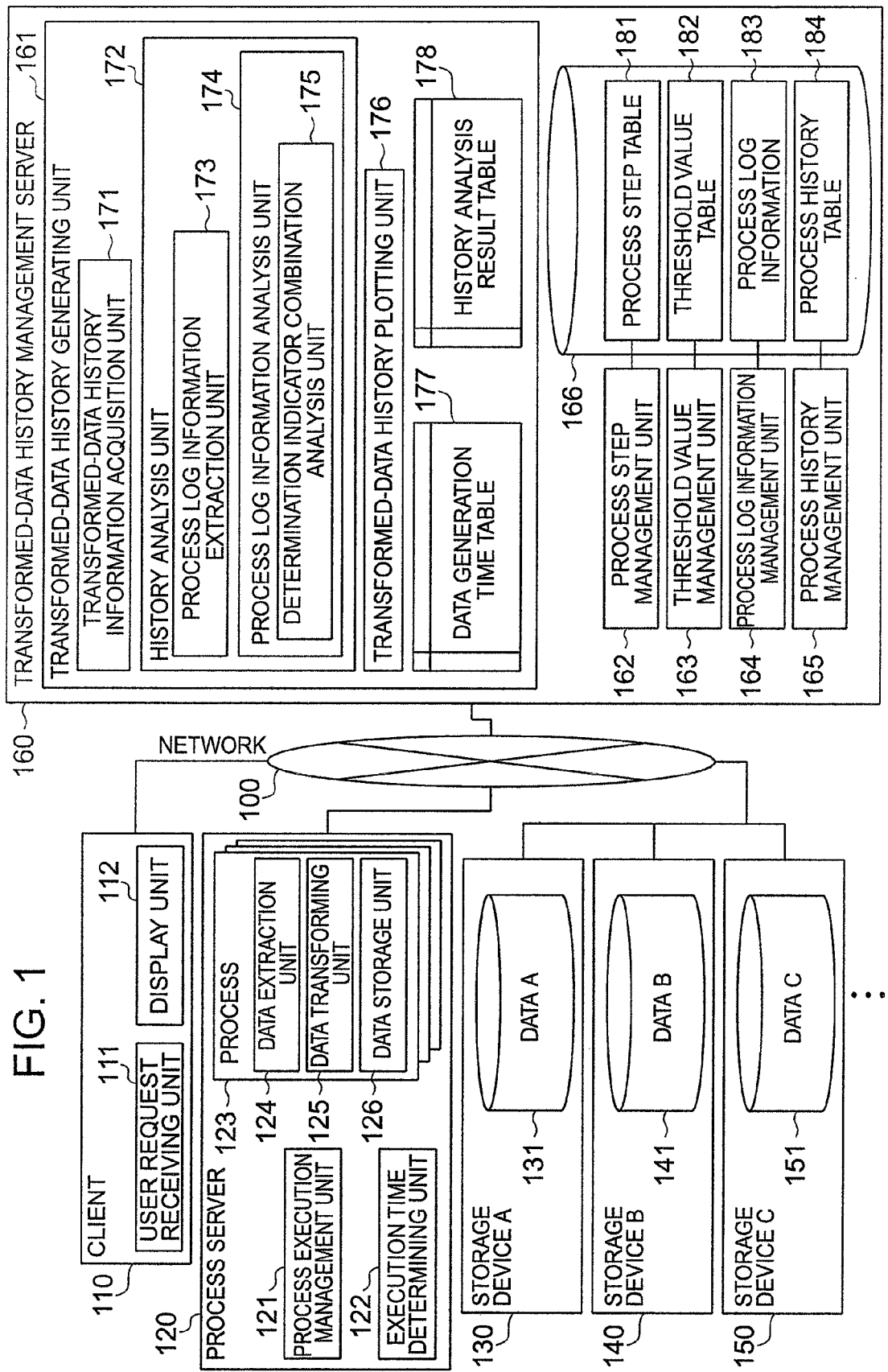
FIG. 1 is a diagram showing the configuration of a data verification aiding system according to an embodiment of the invention.

FIG. 1 is a diagram showing the configuration of a data verification aiding system according to an embodiment of the invention. The data verification aiding system, as shown in FIG. 1, includes a client 110, a process server 120, a transformed-data history management server 160 and a storage device group. The client 110, the process server 120, the transformed-data history management server 160 and the storage device group are connected to each other through a network 100.

The storage device group is configured of a plurality of storage devices including a storage device A 130, a storage device B 140 and a storage device C 150. The storage device group may be configured of a single storage device or, as shown in FIG. 1, a plurality of storage devices.

The client 110, the process server 120 and the transformed-data history management server 160 may be individually mounted on a computer as shown in FIG. 1, or configured in a single computer. Further, the network 100 may be connected to various computers or peripheral devices not shown.

The client 110 includes a user request receiving unit 111 and a display unit 112. The user request receiving unit 111 receives a display request for a data verification screen from the user and requests the transformed-data history management server 160 to generate and display the analyzed transformed-data history in which a process related to an anomaly has been extracted. The display unit 112 displays the data verification screen including the analyzed transformed-data history which is generated by the transformed-data history management server 160 and in which the process related to an anomaly is extracted.

The process server 120 holds the information on one or a plurality of processes, and manages the execution of each process. The process server 120 further includes a process execution management unit 121 and an execution time determining unit 122. The process execution management unit 121 manages the execution of the process 123 with the transformed-data processing steps defined. The execution time determining unit 122 determines, at the time of process execution, whether the anomaly probability of the process execution by the process execution management unit 121 is high or not. The anomaly of the process execution includes a case where the time required for the process executed is not included in a predetermined range as well as a case in which the value of the data generated by the process is anomalous.

The process 123 includes a data extraction unit 124, a data transforming unit 125 and a data storage unit 126. The data extraction unit 124 extracts the input source data to be transformed, from the storage device. The data transforming unit 125 transforms the extracted data in accordance with the steps defined in advance. The data storage unit 126 stores the transformed data as an output destination data in the storage device.

According to an embodiment of the invention, the storage device group, as shown in FIG. 1, is configured of a plurality of storage devices. The data A 131 of the storage device A 130 constitutes the input source data transformed by process execution or the output destination data generated by process execution. This is also the case with the data B 141 of the storage device B 140 and the data C 151 of the storage device C 150.

The transformed-data history management server 160 receives the request from the user request receiving unit 111 of the client 110, analyzes the history of process execution and plots the data verification screen including the analyzed transformed-data history in which the process related to an anomaly is extracted. The transformed-data history management server 160 includes a transformed-data history generating unit 161, a data 166, a process step management unit 162, a threshold value management unit 163, a process log information management unit 164 and a process history management unit 165.

The transformed-data history generating unit 161 analyzes the result of process execution by the process server 120, and transmits the result to the client 110 for display. The transformed-data history generating unit 161 includes a transformed-data history information acquisition unit 171, a history analysis unit 172, a transformed-data history plotting unit 176, a data generation time table 177 and a history analysis result table 178.

The transformed-data history information acquisition unit 171 acquires the process execution steps and acquires the information for generating the transformed-data history. The history analysis unit 172 analyzes the history information based on the process execution steps, the log information of the process of which the anomaly probability is determined to be high at the time of process execution and the process execution history information. The transformed-data history plotting unit 176 instructs the client 110 to plot the data verification screen including the analyzed transformed-data history.

The data generation time table 177, used for the process of analyzing the history, stores the generation time of the data to be verified. The history analysis result table 178 stores the history analysis result.

The history analysis unit 172 includes a process log information extraction unit 173, a process log information analysis unit 174 and a determination indicator combination analysis unit 175. The process log information extraction unit 173 extracts the log information of the process (hereinafter sometimes referred to as the process log information) of which the anomaly probability is determined to be high at the time of process execution. The process log information analysis unit 174 and the determination indicator combination analysis unit 175, based on the process log information and the process execution history information, analyze more in detail the process execution determined with the high anomaly probability.

The data 166 is used for analyzing the process execution time and the process execution history information. The data 166 includes a process step table 181, a threshold value table 182, process log information 183 and a process history table 184.

The process step table 181 stores the process execution steps. The process history management unit 165 manages the process execution steps stored in the process step table 181.

The threshold value table 182 stores the threshold values providing a reference for anomaly determination of the process execution or the data generated by the process execution. The threshold value management unit 163 manages the threshold values stored in the threshold value table 182.

The process log information 183 stores the log information of the process execution determined to be high in anomaly probability by the execution time determining unit 122 of the process server 120. The process log information management unit 164 manages the log information of the process execution determined to have the high anomaly probability, stored in the process log information 183.

The process history table 184 stores the process execution history. The process history table 184 stores the execution history of all the normal and anomalous processes. The process history management unit 165 manages the process execution history stored in the process history table 184.

Figure 2:
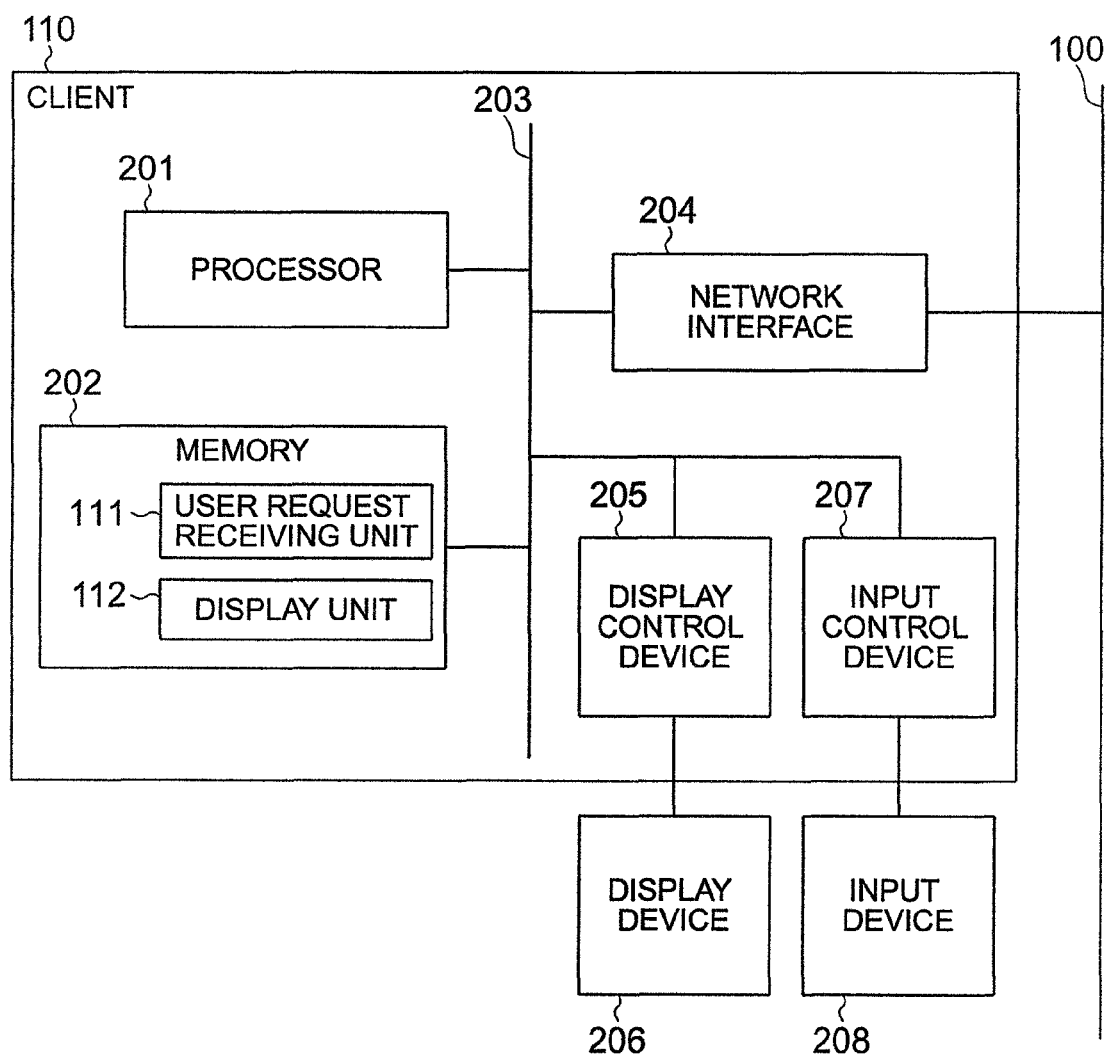
FIG. 2 is a diagram showing the configuration of a client according to an embodiment of the invention.

FIG. 2 is a diagram showing the configuration of the client 110 according to an embodiment of the invention. The client 110 includes a processor 201, a memory 202, a network interface 204, a display control device 205 and an input control device 207. The processor 201, the memory 202, the network interface 204, the display control device 205 and the input control device 207 are connected to each other through an internal bus 203.

The processor 201 executes the various types of processes by executing the programs stored in the memory 202. The memory 202 stores the programs executed by the processor 201 and the information required by the processor 201. The programs stored in the memory 202 specifically correspond to the user request receiving unit 111 and the display unit 112 as shown in FIG. 2.

The network interface 204 is connected to the network 100. The display control device 205 controls the display device 206 connected to the client 110. The display device 206 is a display, for example, for outputting the information such as the data verification screen. The input control device 207 controls the input device 208 connected to the client 110. The input device 208 is a keyboard or a mouse, for example, for inputting the information such as a data verification screen display request.

Figure 3:
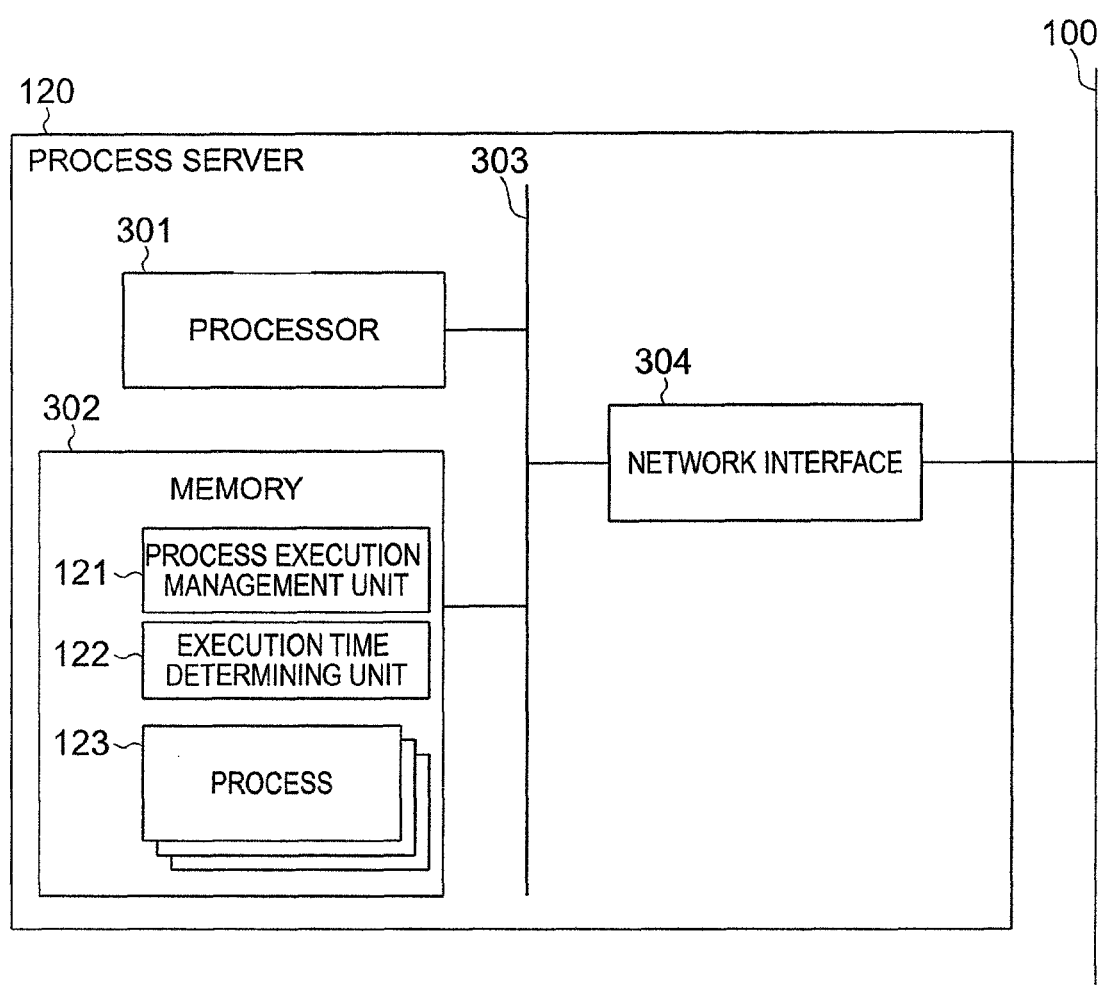
FIG. 3 is a diagram showing the configuration of a process server according to an embodiment of the invention.

FIG. 3 is a diagram showing the configuration of the process server 120 according to an embodiment of the invention. The process server 120 includes a processor 301, a memory 302 and a network interface 304. The processor 301, the memory 302 and the network interface 304 are connected to each other through an internal bus 303.

The processor 301 executes various types of processes by executing the program stored in the memory 302. The memory 302 stores the program executed by the processor 301 and the information required for the processing. The program and the information stored in the memory 302 specifically constitute a process execution management unit 121, an execution time determining unit 122 and a plurality of processes 123 as shown in FIG. 3. The network interface 304 is connected to the network 100.

Figure 4:
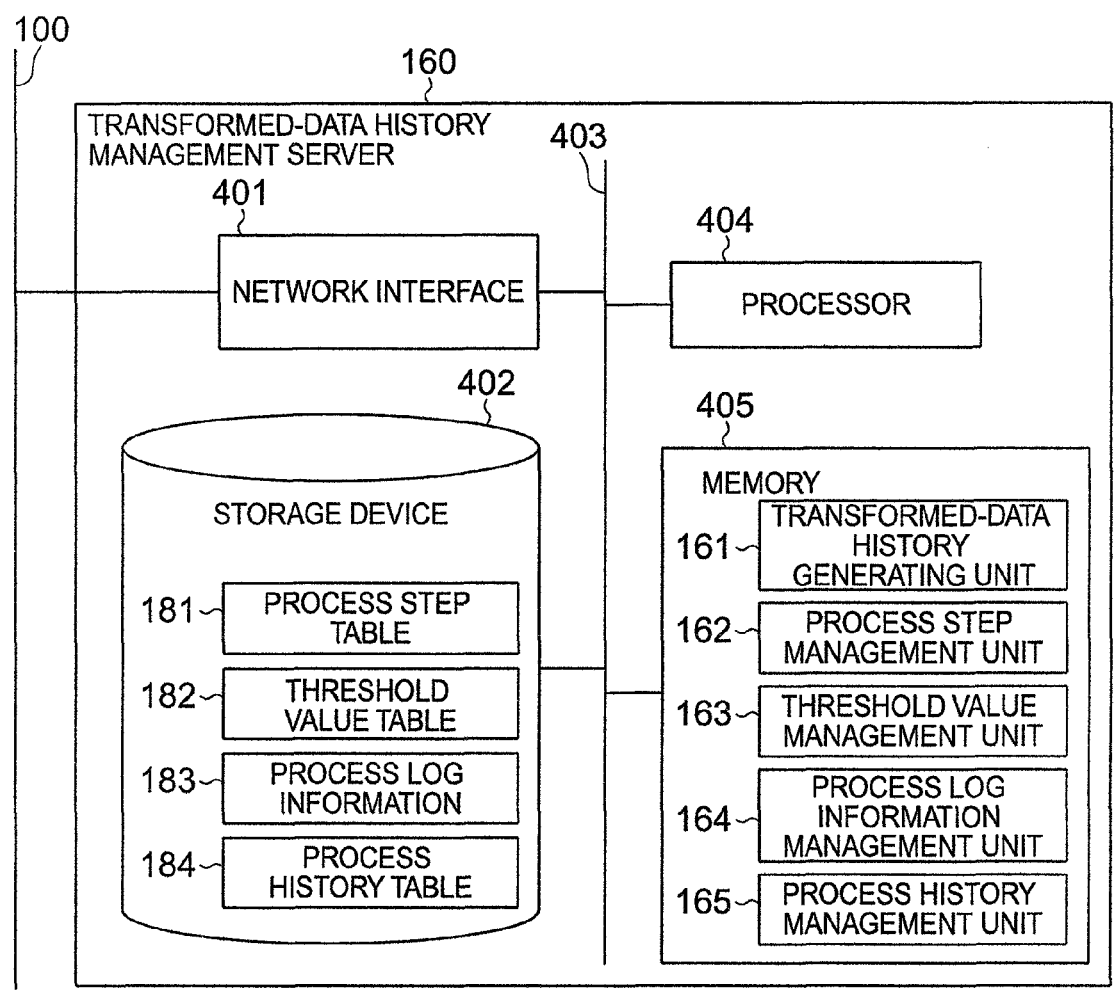
FIG. 4 is a diagram showing the configuration of a transformed-data history management server according to an embodiment of the invention.

FIG. 4 is a diagram showing the configuration of the transformed-data history management server 160 according to an embodiment of the invention. The transformed-data history management server 160 includes a processor 404, a memory 405, a network interface 401 and a storage device 402. The processor 404, the memory 405, the network interface 401 and the storage device 402 are connected to each other through an internal bus 403.

The processor 404 executes the various processes by executing the program stored in the memory 405. The memory 405 stores the program executed by the processor 404 and the information required for the processing. The program stored in the memory 405, as shown in FIG. 4, constitutes a transformed-data history generating unit 161, a process step management unit 162, a threshold value management unit 163, a process log information management unit 164 and a process history management unit 165.

The network interface 401 is connected to the network 100. The storage device 402 stores the information required for the program executed by the processor 404 and the program executed by the computer other than the transformed-data history management server 160. The information stored in the storage device 402 constitutes the data 166 shown in FIG. 1, i.e. the process step table 181, the threshold value table 182, the process log information 183 and the process history table 184.

FIG. 5 is a diagram showing the process step table 181 according to an embodiment of the invention. The process step table 181 holds the relation between the process input source data and the process output destination data. The process step table 181 includes a process name 501, an output destination 502 and an input source 503.

The process name 501 holds the name of each process whereby the particular process is uniquely identifiable. The output destination 502 holds the storage unit in which the data generated by the process execution is stored. The input source 503 holds the storage unit in which the data transformed by the process is stored.

The record 504 of the process step table 181 indicates that the data generated by inputting the input source data "data B", "data D" and "data F" to the process "process 1" are output to the output destination data "data A".

The input source data and the output destination data may be constituted of a table of a relational data base, a table column, a table record or a file which can be transformed by the computer and whose input/output relation is defined.

Also, the process step table 181, which is defined in advance for process execution, is accessed by the execution time determining unit 122 and the transformed-data history generating unit 161 to determine whether the process execution is anomalous or not according to an embodiment of the invention.

Figure 6A:
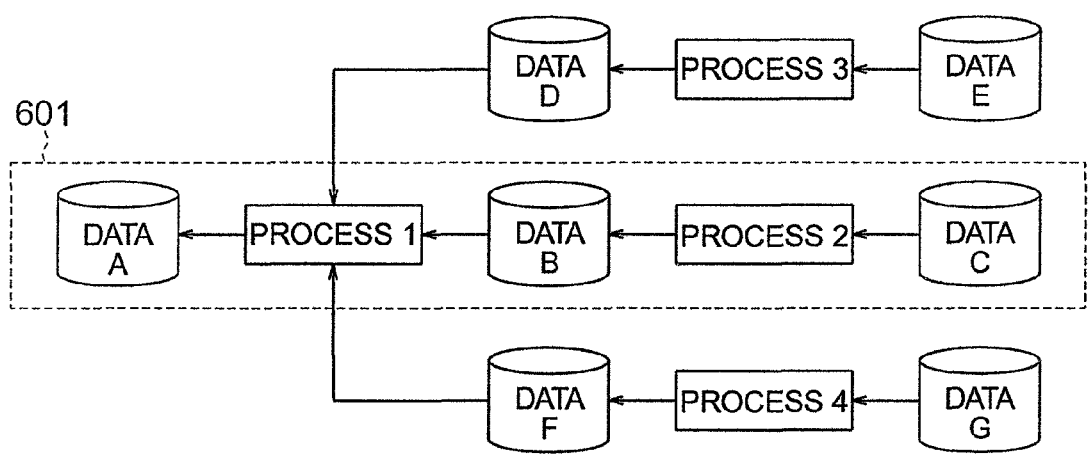
FIG. 6A is a diagram showing the transformed-data history expressed by a hierarchical structure of the relation between each process in the process step table and the input source data and the output destination data according to an embodiment of the invention.
Figure 6B:
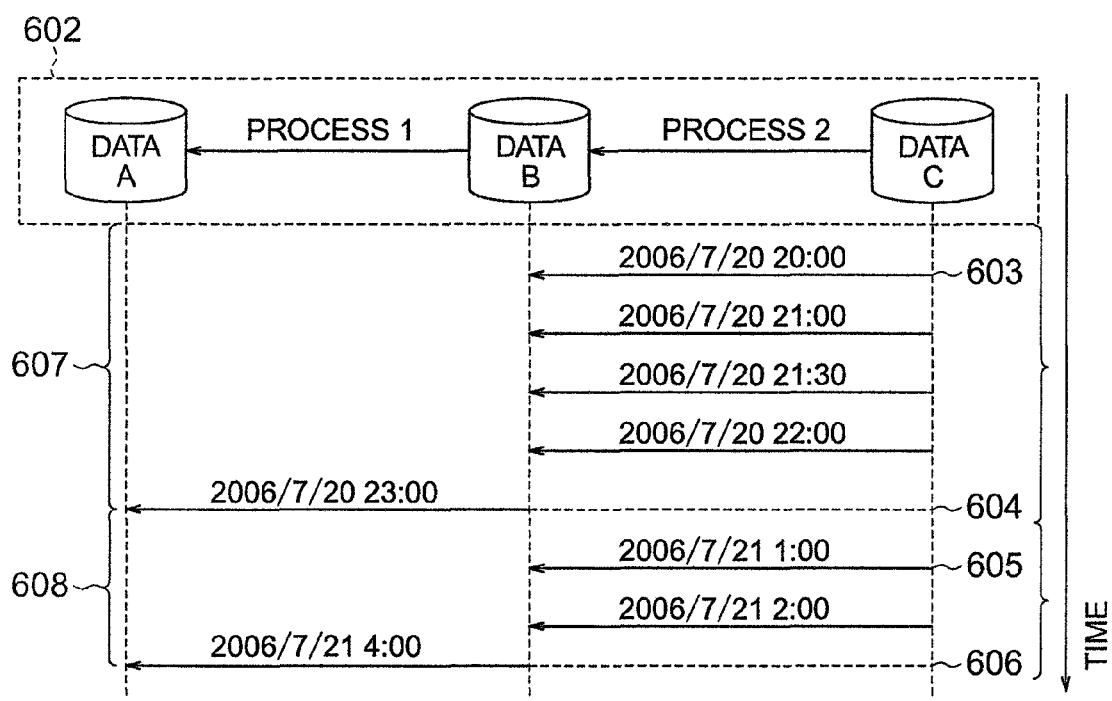
FIG. 6B is a diagram showing the process execution history with time according to an embodiment of the invention.

FIGS. 6A and 6B are diagrams showing the manner in which the process is executed and the data generated based on the steps defined by the process step table 181 according to an embodiment of the invention.

FIG. 6A is a diagram showing a history of transformed data in which the relation between each process in the process step table 181, the input source data and the output destination data is expressed by a hierarchical structure according to an embodiment of the invention. The history of transformed data has a tree structure in which the data and the processes correspond to nodes connected to each other based on the data input/output relation and the final output data is regarded as a root data.

With reference to FIG. 6A, an explanation is given specifically. The "data A", which corresponds to the root node, is generated and output by execution of "process 1" with "data B", "data D" and "data F" as input source data. Further, "data B" is generated and output by executing "process 2" with "data C" as input source data. In similar fashion, "data D" is generated and output by executing "process 3" with "data E" as input source data, and "data F" is generated and output by executing "process 4" with "data G" as input source data.

Also, the processes 1, 2 and 3 are repeatedly executed by batch processing or the like, and each has a corresponding execution history for each execution. Therefore, the transformed-data history also has a corresponding execution history.

FIG. 6B is a diagram showing the process execution history with time according to an embodiment of the invention. FIG. 6B shows "process 1" and "process 2" constituting a part of the transformed-data history shown in FIG. 6A and the relation (601 and 602) between the input/output data of "process 1" and "process 2".

According to the process execution history shown in FIG. 6B, "process 2" is executed at the time "2006/7/20 20:00" (603), and then three more times thereafter. After "process 2" is executed four times in total, "process 1" is executed at time "2006/7/20 23:00" (604).

After completion of the execution 604 of "process 1", "process 2" is executed at time "2006/7/21 1:00" (605). The contents processed by the execution 605 of "process 2" are not reflected in the input source data for the execution 604 of "process 1". Then, the contents processed in the execution 605 of "process 2" are reflected in the input source data for the execution 606 of "process 1" executed thereafter.

As described above, the input source data at the time of process execution becomes the data generated by the process with the particular input source data as the output destination data after completion of the previous process execution. According to this invention, therefore, the execution history for each process is called the generation time block. Specifically, numerals 607 and 608 designate the generation time block of "data A".

Now, an explanation is given about the threshold value table 182, the process log information 183 and the process history table 184 used in the execution time determining unit 122 and the transformed-data history generating unit 161.

FIG. 7 is a diagram showing the threshold value table 182 according to an embodiment of the invention. The threshold value table 182 stores the threshold values used in anomaly determination by the execution time determining unit 122 of the process server 120 at the time of process execution.

The threshold value table 182 includes a process name 701, a name of a data to be determined (hereinafter sometimes referred to as the determination object data name) 702, a determination indicator 703, an average value 704 of the values corresponding to the determination indicators, a minimum threshold value 705 and a maximum threshold value 706 corresponding to the determination indicator.

The execution time determining unit 122 compares the value corresponding to the determination indicator 703 for the determination object data name 702 with the average value 704, the minimum threshold value 705 and the maximum threshold value 706 thereby to make an anomaly determination of the process execution. For example, the ratio between the value of the determination object data and the average value 704 is compared with the minimum threshold value 705 and the maximum threshold value 706, or the very value of the determination object data is compared with the minimum threshold value 705 or the maximum threshold value 706.

The record 707 of the threshold value table 182 uses "data value" as a determination indicator for the data "Table-A Profit/loss ratio" at the time of the execution of "process 1". Further, it indicates that the average value of the data before determination is "96.5", and the threshold value setting is "0.8" for a minimum value and "1.2" for a maximum value. The minimum threshold value and the maximum threshold value of the record 707 are used for anomaly determination not by comparing the minimum threshold value and the maximum threshold value themselves, but by comparing the ratio of the average value.

As an example, in the case where the total value (data value) is "97", for example, the ratio of the total and average values is 97/96.5=1.01, which is included in the range between the minimum threshold value "0.8" and the maximum threshold value "1.2", and therefore, it is determined as normal. In the case where the total value is "138", on the other hand, the ratio of the total and average values is 138/96.5=1.43, which exceeds the maximum threshold value "1.2", and therefore, it is determined as anomalous.

Also, in the record 708 of the threshold value table 182, the "data value" is used as a determination indicator for the data "Table-B Number of units sold" at the time of execution of "process 2". Further, the average data value before determination is "1232", and the threshold value setting is "900" in minimum and "1800" in maximum. The minimum and maximum threshold values of the record 708 are stored as they are, and by comparing them directly with the average value, an anomaly or normality is determined.

Specifically, the total value (data value), if "1300", is included in the range between the minimum threshold value "900" and the maximum threshold value "1800", and therefore, determined as normal. The total value, if "800", on the other hand, is less than the minimum threshold value "800", and therefore, is determined as anomalous.

FIG. 8 is a diagram showing the process log information 183 according to an embodiment of the invention. The process log information 183 stores the history of the process execution determined to have the high anomaly probability by the execution time determining unit 122 at the time of process execution. The process log information 183 includes a process name 801, a starting time 802 and a determination indicator 803.

The record 804 of the process log information 183 indicates that as the result of determining whether "process 1" executed at "2006/7/20 23:00" is anomalous or not with "data value" as a determination indicator, the anomaly probability of "process 1" is determined to be high.

FIG. 9 is a diagram showing the process history table 184 according to an embodiment of the invention. The process history table 184 accumulates the history of process execution. The process history table 184 includes a process name 901, a starting time 902, an end time 903, the number of events processed 904, a processing time 905 and the number of times executed 906.

The process name 901 stores the name for identifying the process. The starting time 902 stores the time at which the process execution is started. The end time 903 stores the time at which the process execution ends.

The number of events processed 904 stores the number of data handled from the execution starting time to the end time by the process specified by the process name 901. The processing time 905 stores the time required from the start to end of execution of the process. The number of times executed 906 stores the number of times the process for generating the input source data of the particular process is executed within the generation time block.

The record 907 indicates that the execution of "process 1" is started at "2006/7/20 23:00" and ended at "2006/7/21 1:00". Further, it indicates that the during the execution of "process 1", "250" data are processed for the processing time of "2:00", and the process to generate the input source data is executed "5" times.

Next, the operation of the process execution management unit 121 and the execution time determining unit 122 for determining whether the process execution is anomalous or not is explained with reference to a flowchart.

Figure 10:
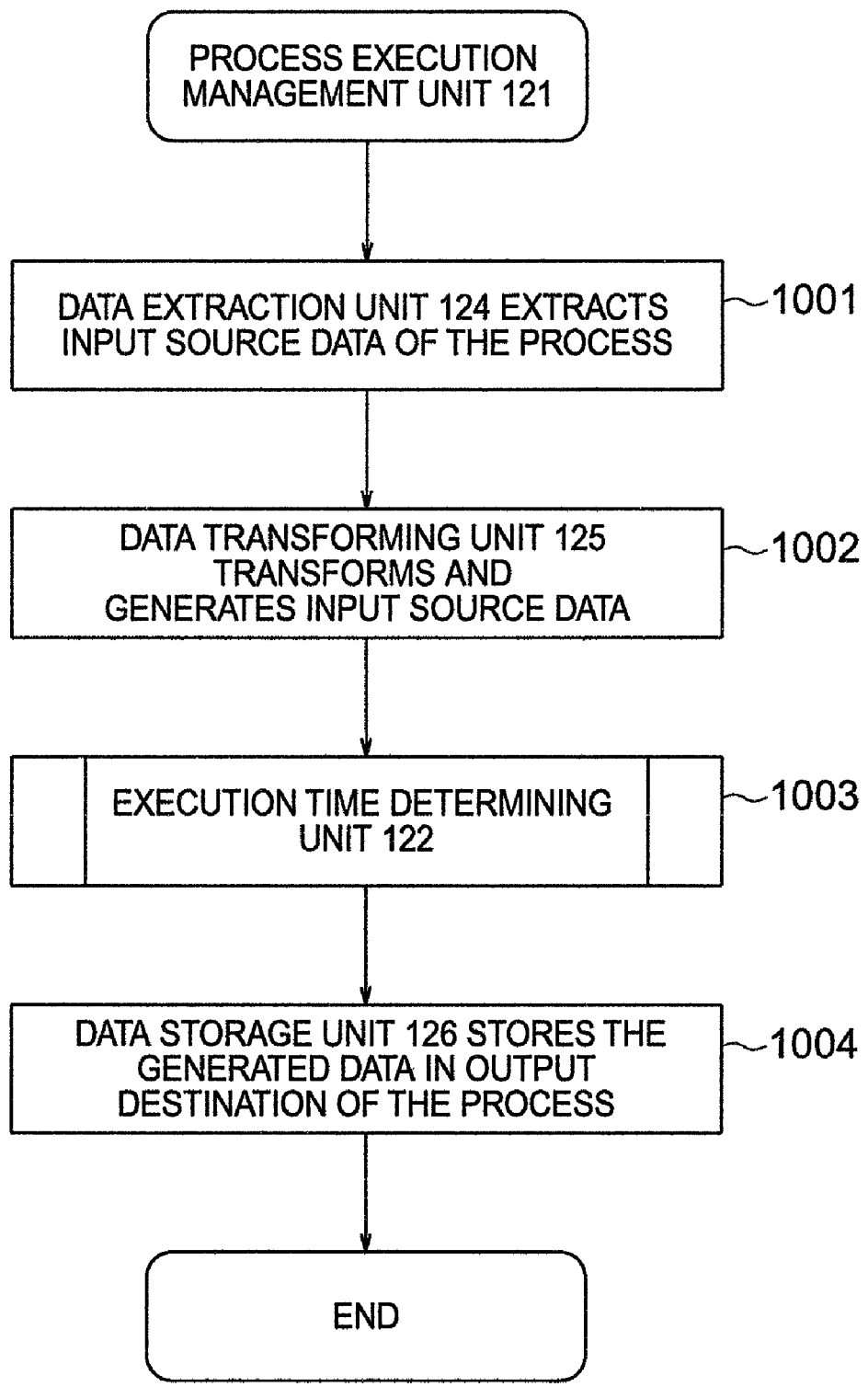
FIG. 10 is a flowchart showing the steps of process execution by a process execution management unit according to an embodiment of the invention.

FIG. 10 is a flowchart showing the steps of the process executed by the process execution management unit 121 according to an embodiment of the invention.

In the case where the process execution management unit 121 receives the process execution request by a batch process or the like, the data extraction unit 124 extracts the input source data from the storage device based on the information of the input source data of the process stored in the process step table 181 (1001).

The data transforming unit 125 transforms the extracted input source data in accordance with the processing steps defined in advance (1002). The execution time determining unit 122, upon complete data transformation, determines whether the process execution has a high anomaly probability or not (1003). The operation of the execution time determining unit 122 is explained later with reference to FIG. 11.

The data storage unit 126, upon complete determination by the execution time determining unit 122, stores the generated data in the storage device based on the information of the output destination of the process stored in the process step table 181 (1004).

Figure 11:
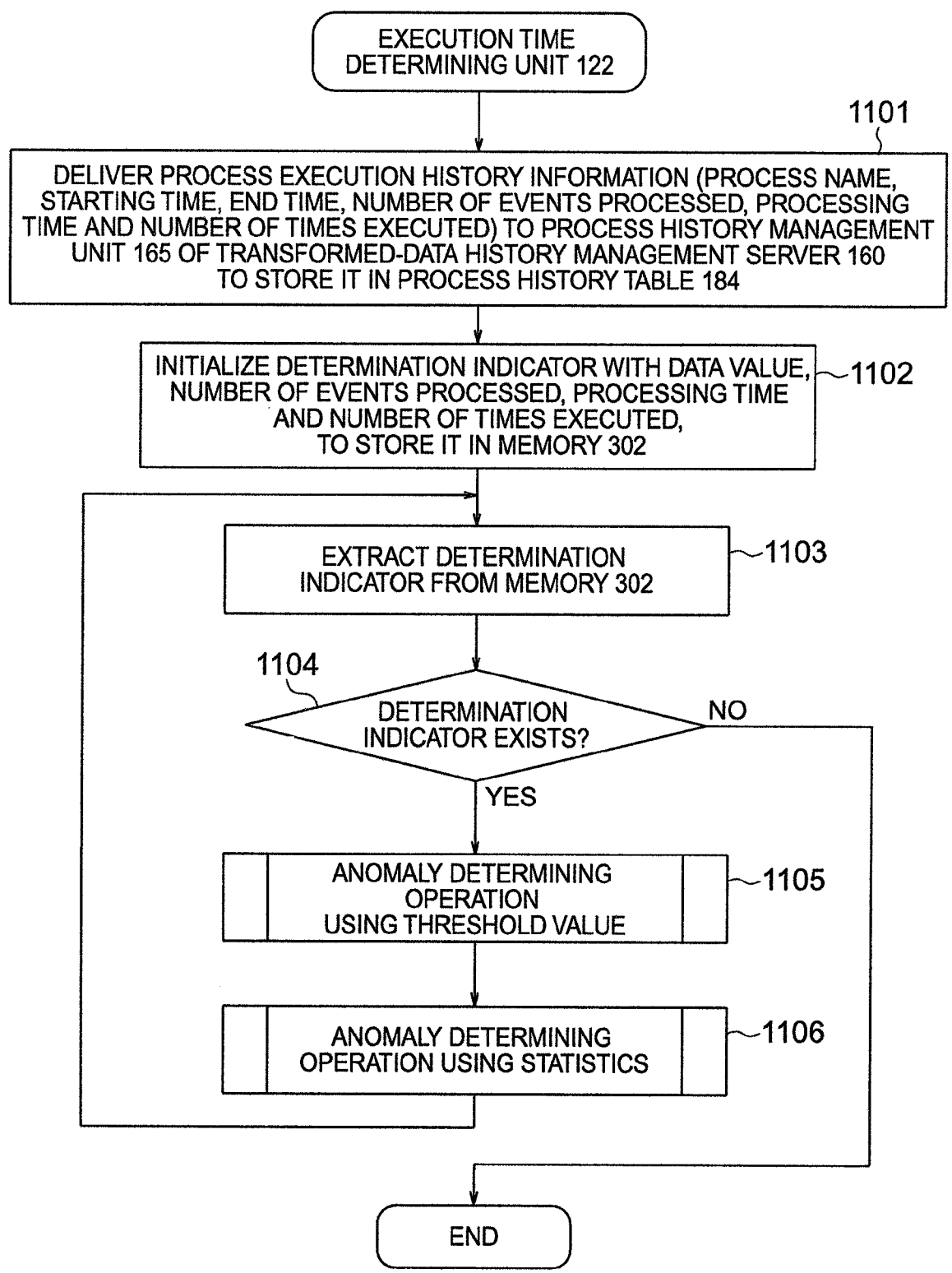
FIG. 11 is a flowchart showing the operation of an execution time determining unit for determining whether the process execution by the process execution management unit is anomalous or not according to an embodiment of the invention.

FIG. 11 is a flowchart showing the operation of the execution time determining unit 122 for determining whether the process execution by the process execution management unit 121 according to an embodiment of the invention has a high anomaly probability or not.

The execution time determining unit 122, after data generation by process execution (1002 in FIG. 10), transmits the process execution history information to the process history management unit 165 of the transformed-data history management server 160 (1101). The process execution history information thus transmitted specifically include the process name, the starting time, the end time, the number of events processed, the processing time and the number of times executed. The process history management unit 165 stores the process execution history information thus received in the process history table 184 (1101).

Next, the execution time determining unit 122 acquires, from the threshold value table 182, the determination indicator used for determining whether the process execution is anomalous or not, and stores it in the memory 302 (1102). According to an embodiment of the invention, the threshold values including "data value", "number of events processed", "processing time" and "number of times executed" are stored in the memory 302.

The execution time determining unit 122 extracts the determination indicator stored in the memory 302 and not processed (1103). In the case where the determination indicator is extracted (YES in 1104), the execution time determining unit 122 determines whether the process execution is anomalous or not based on the threshold value stored in the threshold value table 182 (1105). Further, the execution time determining unit 122 statistically determines whether the process execution is anomalous or not from the process execution history information held in the process history table 184 (1106). In the case where the determination indicator not processed is not extracted after anomaly determination for all the determination indicators (NO in 1104), the operation of the execution time determining unit 122 is ended.

The execution time determining unit 122 continues the operation of steps 1103 to 1106 until the anomaly determining operation is completed for all the determination indicators recorded in the memory 302.

Figure 12:
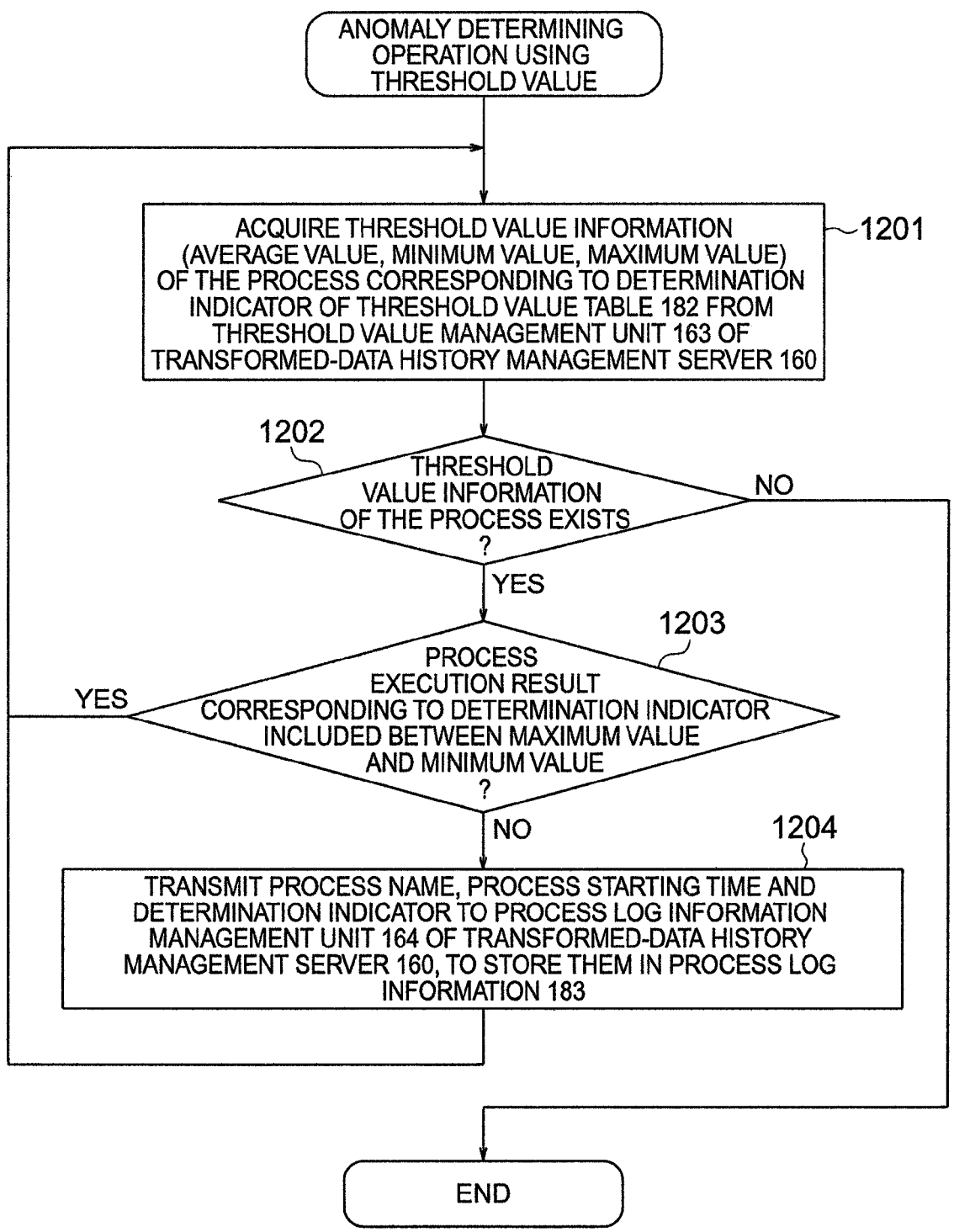
FIG. 12 is a flowchart showing the steps of the anomaly determining operation based on a threshold value in the operation of the execution time determining unit according to an embodiment of the invention.

FIG. 12 is a flowchart showing the steps of the anomaly determining operation 1105 based on the threshold value in the operation of the execution time determining unit 122 according to an embodiment of the invention.

The anomaly determining operation 1105 using the threshold value determines whether the process execution is anomalous or not by comparing the process execution result with the threshold value based on the determination indicator extracted from the memory by the execution time determining unit 122.

In the anomaly determining operation 1105 based on the threshold value, the execution time determining unit 122 transmits the determination indicator extracted from the memory 302 to the threshold value management unit 163 of the transformed-data history management server 160. The threshold value management unit 163, on the other hand, transmits the threshold value information of the process corresponding to the determination indicator received from the threshold value table 182 (1201). The threshold value information thus transmitted specifically include the average value, the minimum threshold value and the maximum threshold value.

The execution time determining unit 122, upon acquisition of the process threshold value information (YES in 1202), determines whether the result of process execution corresponding to the determination indicator is included in the range from the minimum threshold value to the maximum threshold value (1203). In the case where the process threshold value information cannot be acquired, on the other hand (NO in 1202), the anomaly determining operation 1105 based on the threshold value is ended.

In the case where the result of process execution corresponding to the determination indicator is not included in the range from the minimum threshold value to the maximum threshold value (NO in 1203), the execution time determining unit 122 transmits the determined process name, the process execution starting time and the determination indicator to the process log information management unit 164 of the transformed-data history management server 160. The process log information management unit 164 stores the received information in the process log information 183 (1204).

In the case where the result of the process execution corresponding to the determination indicator is included in the range from the minimum threshold value to the maximum threshold value (YES in 1203), on the other hand, the execution time determining unit 122 determines the particular determination indicator as normal, and returns to the operation 1201 to acquire the threshold value information corresponding to another determination indicator. The operation 1201 to 1204 continues to be executed until the threshold value information of the process corresponding the determination indicator ceases to exist.

With regard to the execution 604 of the process 1 shown in FIG. 6B, the anomaly determining operation 1105 using a threshold value is explained. First, referring to the record 707 of the threshold value table 182, the determination indicator is "data value". Further, with "Table-A Profit/loss ratio" as an object to be determined, the average value of the data before being transformed is "96.5", the minimum threshold value "0.8" and the maximum threshold value "1.2".

In the process, assume that the value of the data generated is 135.2. The ratio between the value of the data generated and the average value is 1.4, which is not included in the range between the minimum threshold value and the maximum threshold value. The anomaly determining operation 1105 using the threshold value, therefore, determines the result of the execution 604 of the process 1 as anomalous. As a result, the execution time determining unit 122 inserts the record 804 with values of "process 1", "2006/7/20 23:00" and "data value" in the process log information 183.

Figure 13:
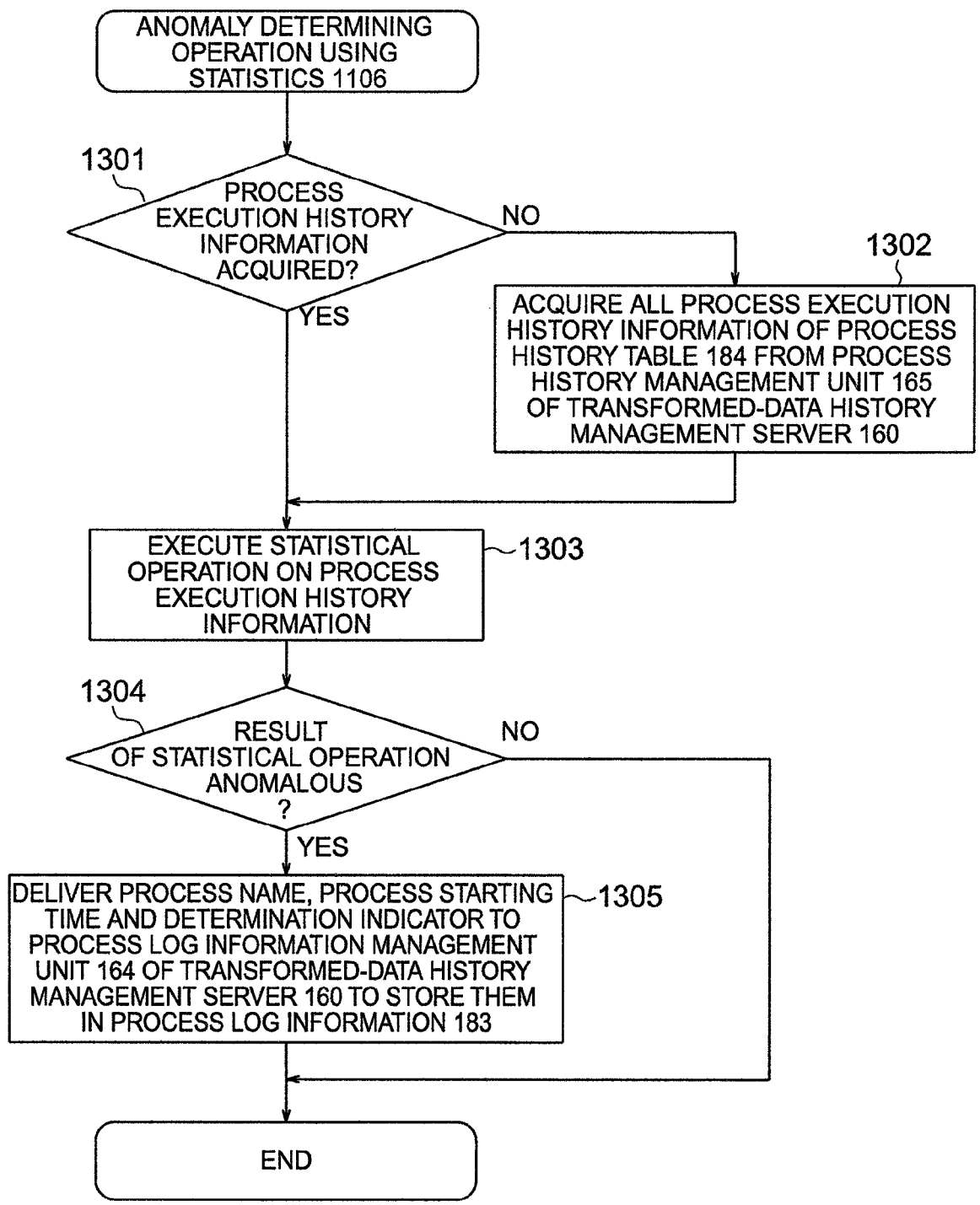
FIG. 13 is a flowchart showing the steps of the anomaly determining operation based on the statistics in the operation of the execution time determining unit according to an embodiment of the invention.

FIG. 13 is a flowchart showing the steps of the anomaly determining operation 1106 based on the statistical operation in the operation of the execution time determining unit 122 according to an embodiment of the invention.

In the anomaly determining operation 1106 based on the statistical operation, the history information of process execution is totalized, and the anomaly or normality of the process execution is determined based on the determination indicator extracted from the memory 302 by the execution time determining unit 122 using the statistical operation. The statistical operation is not specifically limited as long as it is a calculation method suitable for the determination indicator.

In the anomaly determining operation 1106 based on the statistical operation, the execution time determining unit 122 confirms whether the process execution history information stored in the process history table 184 is already acquired or not (1301).

In the case where the process execution history information has not yet been acquired (NO in 1301), the execution time determining unit 122 requests the process history management unit 165 of the transformed-data history management server 160 to acquire the process execution history information. The process history management unit 165, upon receipt of the request to acquire the process execution history information, transmits by acquiring the related information from the process history table 184 (1302).

In the case where the process execution history information has already been acquired (YES in 1301), the execution time determining unit 122 executes the statistical operation corresponding to the determination indicator using the process execution history information (1303). In the case where the result of the statistical operation shows that the process execution has a high anomaly probability (YES in 1304), the process name, the process execution starting time and the determination indicator determined are transmitted to the process log information management unit 164 of the transformed-data history management server 160. The process log information management unit 164 stores the received information in the process log information 183 (1305). The execution time determining unit 122, upon determination that the process execution is normal (NO in 1304), ends the anomaly determining operation 1106.

Now, with regard to the execution 603 of the process 2 shown in FIG. 6B, the anomaly determining operation 1106 based on the statistical operation with "number of events processed" as a determination indicator is explained.

The anomaly determining operation 1106 based on the statistical operation may be the comparison, for example, with the average of the past achievement value. Specifically, the number of events processed "200" of the execution 603 of the process 2 is compared with the average value (for example, "90") of the number of events processed in another execution of the process 2 stored in the process history table 184. Then, the number of events processed "200" of the execution 603 of the process 2 is different from the average value 90, and the number of events processed is determined as anomalous. In this case, the record including the values of "process 2", "2006/7/20 20:00" and "number of events processed" is inserted in the process log information 183.

As described above, even for business data of a variety of types defined in advance, the system can determine whether the process execution is anomalous or not based on the threshold value or the statistical operation by using a uniformly applicable determination indicator. The statistical operation may be other than the comparison with the average value described above as an example. For example, even if the total value is within a predetermined range, it may be determined to be anomalous that the result of calculation of the dispersion of each value is larger than a predetermined value.

The process log information 183 generated by the operation explained above with reference to FIGS. 10 to 13 is used for the analysis of the process execution history carried out by the transformed-data history generating unit 161 of the transformed-data history management server 160.

Next, the user request receiving unit 111 included in the client 110 and the transformed-data history generating unit 161 of the transformed-data history management server 160 are explained. The user request receiving unit 111 transmits a data verification screen display request or a determination indicator to the transformed-data history management server 160. The transformed-data history generating unit 161, upon receipt of the data verification screen display request, displays the data verification screen. Further, the transformed-data history generating unit 161, upon receipt of the analysis conditions, analyzes the process execution history and generates the analyzed transformed-data history by extracting the process related to an anomaly.

FIG. 14 is a diagram showing a screen 1401 for displaying the data generated by the process execution according to an embodiment of the invention. The screen 1401 is displayed by the display unit 112 on the display device 206 connected to the client 110.

The user, after the screen 1401 is displayed on the display device 206 from the client 110, selects the data to be accessed from a data name component box 1402. Once the value of the data name component box 1402 is selected, the corresponding data is acquired from the storage device and displayed as reference data 1403.

Further, upon operation of a data verification screen display button 1404, the user request receiving unit 111 transmits the data verification screen display request described later to the transformed-data history generating unit 161 of the transformed-data history management server 160.

FIG. 15 is a diagram showing the data generation time table 177 according to an embodiment of the invention. The data generation time table 177 stores the time at which the process which has generated the data to be verified is executed. Incidentally, the data generation time table 177 is temporary information managed by the transformed-data history generating unit 161 and recorded in the memory 405.

The data generation time table 177 includes a block ID 1501 and a starting time 1502. The block ID 1501 stores identifiers for uniquely identifying each generation time block. The starting time 1502 stores the time at which the execution of the process that has generated the data is started.

The data generation time table 177, in the case shown in FIG. 15, assigns the block IDs 1501 in descending order. Nevertheless, the block IDs 1501 may be assigned either in descending order as shown in FIG. 15 or in ascending order.

FIG. 16 is a diagram showing a history analysis result table 178 according to an embodiment of the invention. The history analysis result table 178 stores the result of the history analysis made by the history analysis unit 172 of the transformed-data history management server 160. Incidentally, the history analysis result table 178 is the temporary information managed by the transformed-data history generating unit 161 and recorded in the memory 405.

The history analysis result table 178 includes a block ID 1601, a process name 1602, a starting time 1603, an end time 1604, a determination result 1605 and a determination indicator 1606.

The block ID 1601 stores an identifier corresponding to the block ID 1501 of the data generation time table 177. The process name 1602, the starting time 1603 and the end time 1604 correspond to the process name 901, the starting time 902 and the end time 903, respectively, in the process history table 184.

The determination result 1605 stores the result of the analysis made by the history analysis unit 172 of the transformed-data history management server 160. In the case where the analysis result is determined as normal, the determination result 1605 is recorded as "no problem", and the determination indicator 1606 remains vacant. In the case where the history analysis result is determined as anomalous, on the other hand, the determination result corresponding to the determination indicator 1606 is stored.

Next, an explanation is give about a series of the operation flow mainly including the request from the screen shown in FIG. 14 to display the data verification screen and the subsequent operation of analyzing, by the transformed-data history generating unit 161, the process for generating the designated data, followed by the operation of displaying the analysis result on the data verification screen.

The user request receiving unit 111, upon operation of a "data verification screen display" button 1404 in FIG. 14, transmits a data verification screen display request to the transformed-data history generating unit 161 of the transformed-data history management server 160. Also, the user request receiving unit 111, in addition to the data verification screen display request, transmits the data to be verified to the transformed-data history generating unit 161 from the input control device 207 of the client 110.

Figure 17:
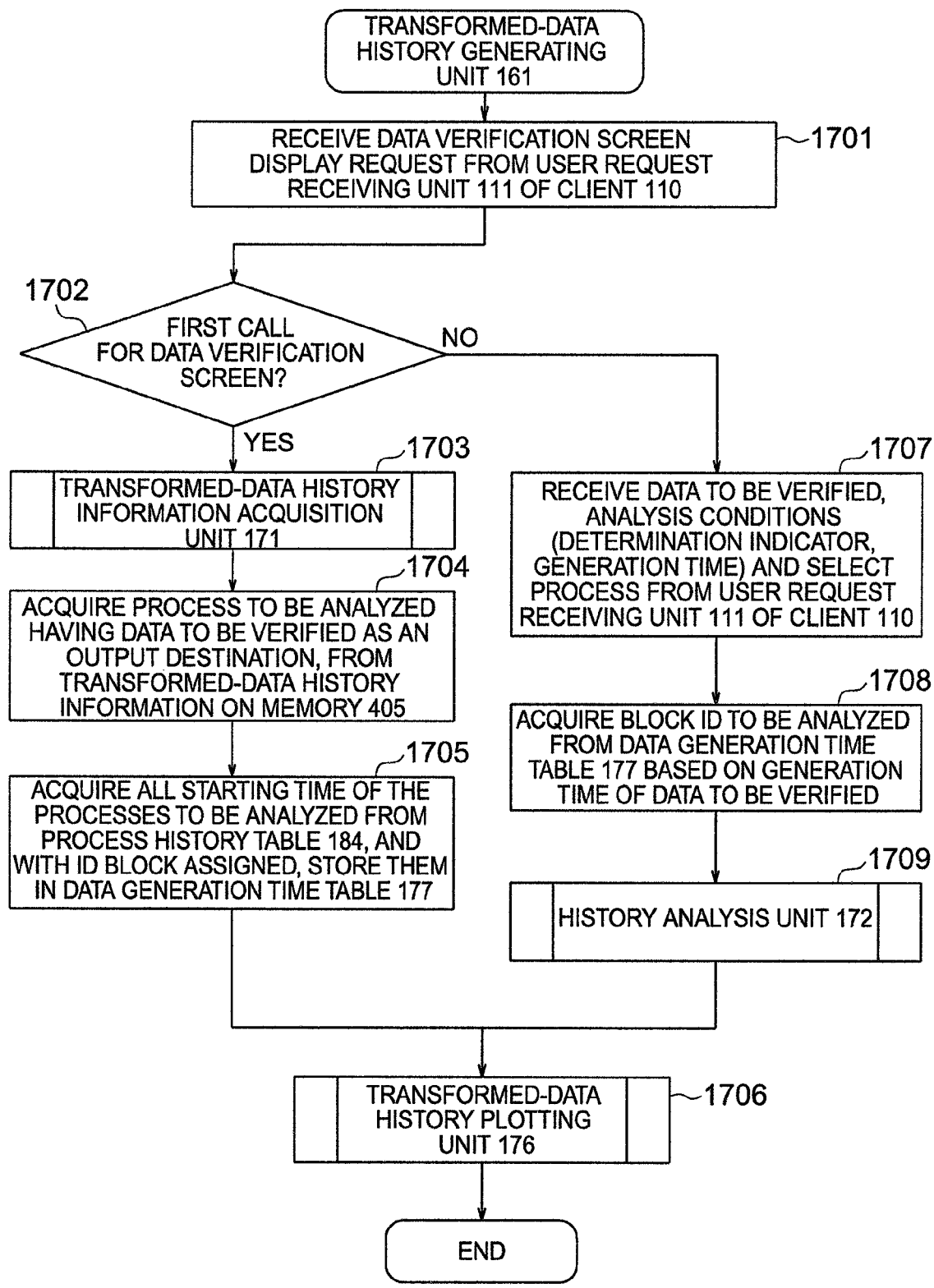
FIG. 17 is a flowchart showing the operation of a transformed-data history generating unit for giving an instruction to analyze the process execution history and plot the data verification screen as requested from the user request receiving unit according to an embodiment of the invention.

FIG. 17 is a flowchart showing the operation performed in the transformed-data history generating unit 161 giving an instruction to analyze the history of the process execution requested by the user request receiving unit 111 and to plot the data verification screen according to an embodiment of the invention.

The transformed-data history generating unit 161, upon receipt of the display request from the user request receiving unit 111 of the client 110 (1701), confirms whether the data verification screen display request is the first call or not (1702). The first call represents a case, for example, in which the data verification screen display request is received with the transformed-data history not stored in the memory 405 such as a case in which the data verification screen is displayed from the screen shown in FIG. 14.

In the case where the data verification screen is the first call (YES in 1702), the transformed-data history generating unit 161 carries out the operation of a transformed-data history information acquisition unit 171 and acquires the transformed-data history information with the data to be verified as the last output data (1703). Specifically, the transformed-data history information having a hierarchical structure is acquired with the data to be verified, as a root node. The detailed operation is explained later with reference to FIG. 18. The transformed-data history information thus acquired is recorded in the memory 405.

Next, the transformed-data history generating unit 161 acquires the process to be analyzed having the output destination in the data to be verified, from the transformed-data history information recorded in the memory 405 (1704). Next, all the starting times of the processes to be analyzed are acquired from the process history table 184, and with the block ID assigned, stored in the data generation time table 177 (1705). The data generation time table 177 shown in FIG. 15, for example, has "process 1" as a process to be analyzed, and is generated by acquiring all the starting times of "process 1" and assigning the block ID.

The transformed-data history plotting unit 176, upon completion of the operation of 1705, displays the data verification screen (1706). Incidentally, with regard to the case where the data verification screen is not the first call (NO in 1702), an explanation is given later.

Figure 18:
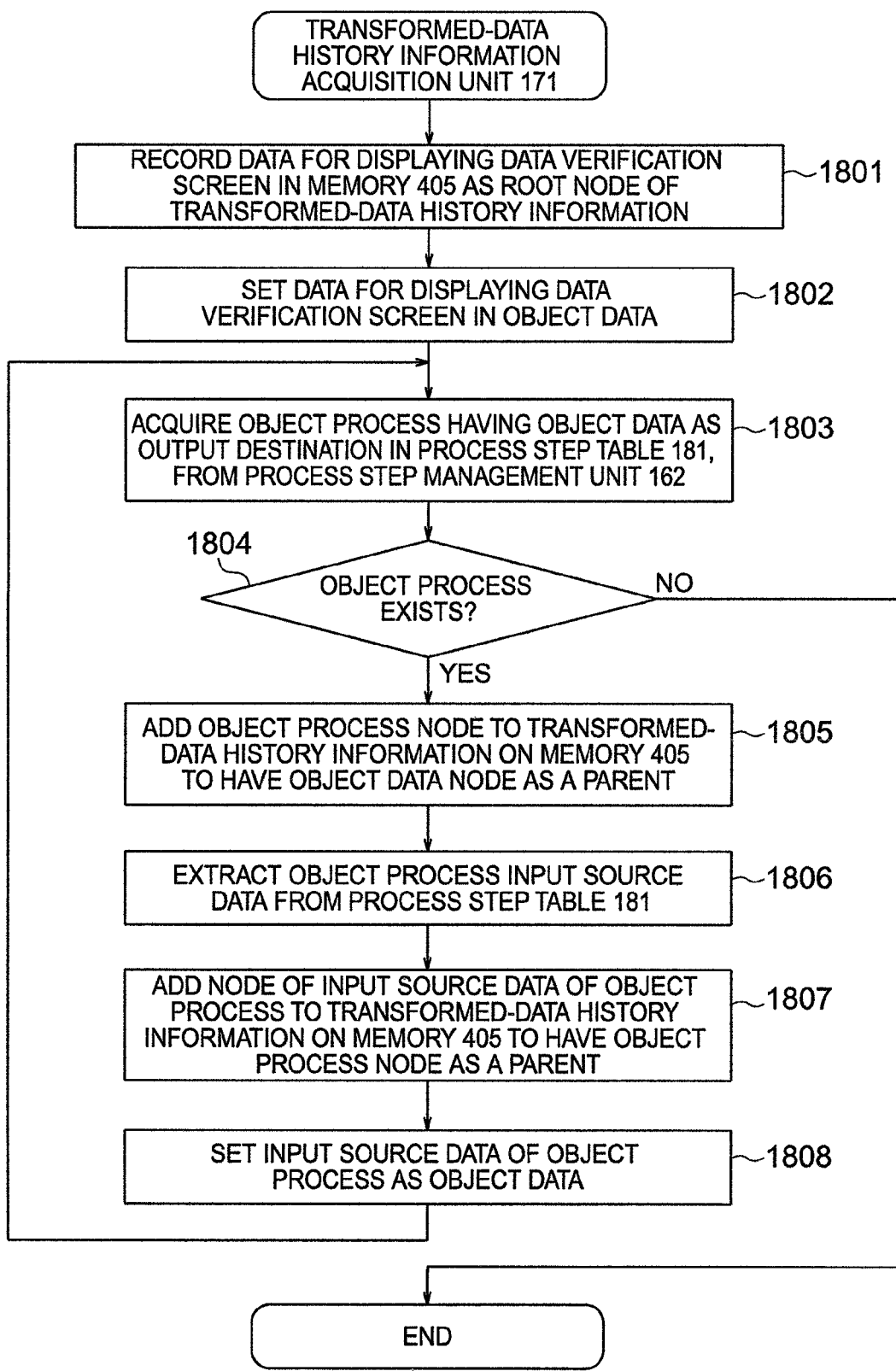
FIG. 18 is a flowchart showing the steps of the operation of a transformed-data history information acquisition unit according to an embodiment of the invention.

FIG. 18 is a flowchart showing the steps of the operation performed by the transformed-data history information acquisition unit 171 according to an embodiment of the invention. The transformed-data history information acquisition unit 171 acquires the information on the history of transformed data to be analyzed as required for history analysis.

The transformed-data history information acquisition unit 171 acquires each process, an input source data and an output destination data from the process step table 181, and generates a hierarchical structure configured of the data and the process for generating the data to be analyzed. Specifically, the tree structure shown in FIG. 6A makes up the particular hierarchical structure.

The transformed-data history information acquisition unit 171 records a data to be verified, as a root node of the transformed-data history information in the memory 405 (1801) and sets it as an object data (1802). The transformed-data history information acquisition unit 171 gives a request to the process step management unit 162 and acquires an object process with the object data of the process step table 181 as an output destination (1803).

The transformed-data history information acquisition unit 171, in the presence of the acquired object process (YES in 1804), adds the node of the object data to the transformed-data history information in the memory 405 with the node of the object data as a parent (1805). In the absence of the acquired object data (NO in 1804), on the other hand, the operation of the transformed-data history information acquisition unit 171 is ended.

The transformed-data history information acquisition unit 171, upon completion of the operation of 1805, extracts the input source data of the object process from the process step table 181 (1806). Then, the node of the input source data of the object process is added to the transformed-data history information in the memory 405 with the node of the object process as a parent (1807). After that, the input source data of the object process is set as an object data and the control returns to the operation of 1803 (1808).

In the case where the data to be verified is "data A" in the process step table 181 shown in FIG. 5, for example, the root node of the transformed-data history information is "data A". Further, in the case where the object data is "data A" and the object process "process 1", the nodes corresponding to each corresponding input source data with the input source data including "data D", "data B" and "data F" are added with "process 1" as a parent node. In similar fashion, by repeating the node add operation of 1803 to 1808, the transformed-data history information having the hierarchical structure shown in FIG. 6A can be acquired.

Figure 19:
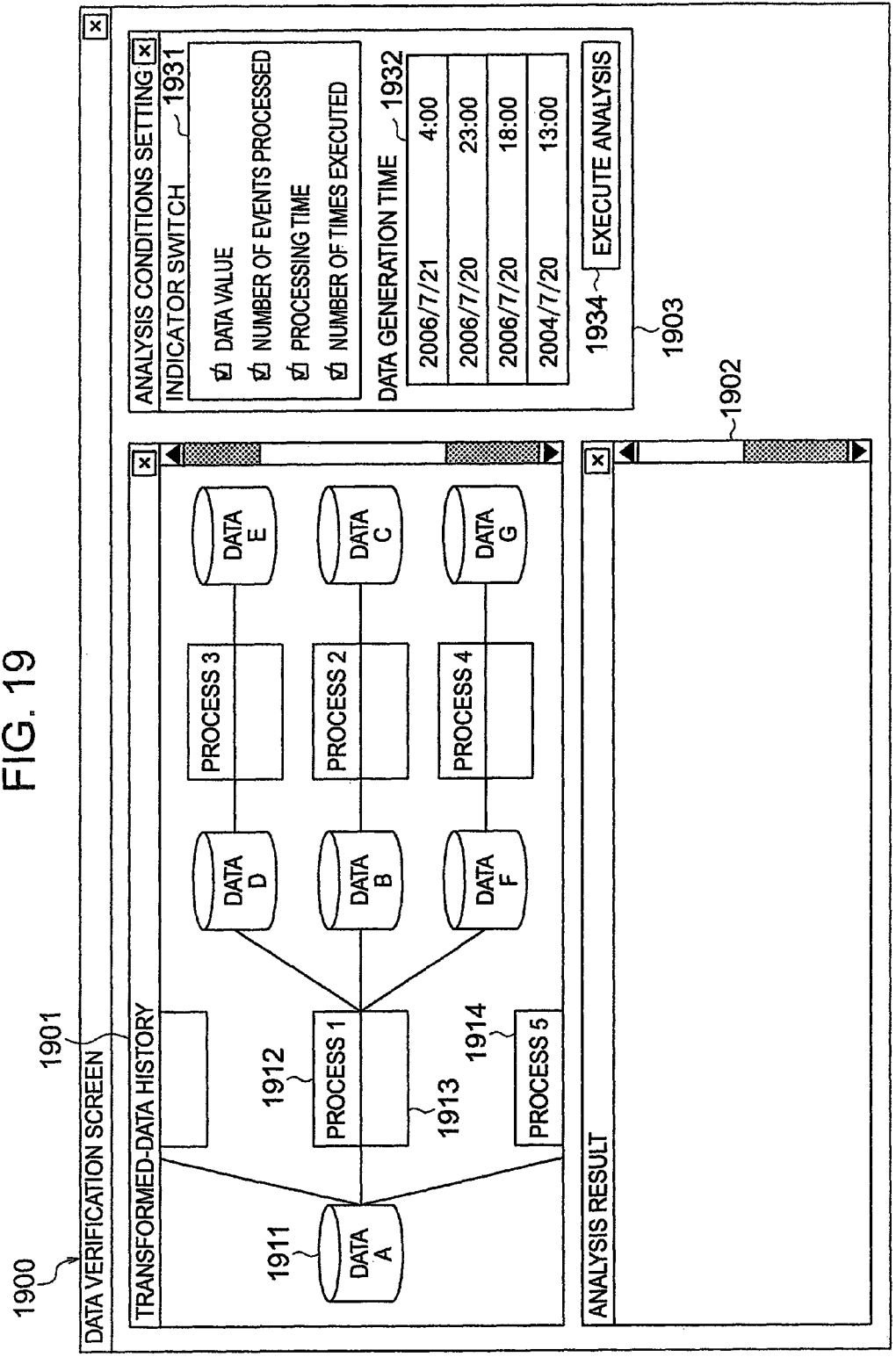
FIG. 19 is a diagram showing the initial state of the data verification screen according to an embodiment of the invention.

FIG. 19 is a diagram showing the initial state of the data verification screen 1900 according to an embodiment of the invention.

The data verification screen 1900 in an initial state is displayed on the display device 206 at the time of the first call of the data verification screen when a plot instruction from the transformed-data history plotting unit 176 is received by the client 110. In the case where the client 110 receives a plot instruction from the transformed-data history plotting unit 176, the display unit 112 displays the data verification screen 1900 on the display device 206 through the display control device 205. Incidentally, the operation of the transformed-data history plotting unit 176 is explained later with reference to FIG. 24.

The data verification screen 1900 in an initial state is configured of a transformed-data history unit 1901, an analysis result unit 1902 and an analysis condition setting unit 1903. The transformed-data history unit 1901, based on the transformed-data history information acquired by the transformed-data history information acquisition unit 171, displays the relation as a hierarchical structure of the data and all the processes with the data to be verified as a root node. Specifically, in this stage, the analysis for extracting only the process related to an anomaly which is the feature of the invention is not yet executed.

The transformed-data history is displayed as a hierarchical structure with the data (for example, "data A" 1911) and the process (for example, "process 1") as a node. The root node of the transformed-data history is displayed at the extreme left of the transformed-data history 1901 ("data A" 1911 in the case of the transformed-data history unit 1901). The node corresponding to each process is displayed with a process name ("process 1" 1912 for the transformed-data history unit 1901) in the upper part and a vacant column in the lower part (1913 for the transformed-data history unit 1901).

The analysis result unit 1902 is a screen for displaying the analysis result of the process selected by the transformed-data history unit 1901, and in the initial state shown in FIG. 19, the analysis process is not executed and therefore nothing is displayed.

The analysis condition setting unit 1903 is configured of the portion for setting the conditions of analysis by the transformed-data history management server 160 including an "indicator switch" check box 1931 and a "data generation time" list 1932 and an "analysis operation" button 1934.

The "indicator switch" check box 1931 selects the determination indicator for history analysis by the transformed-data history management server 160. The "data generation time" list 1932 displays a generation time list of the data ("data A" 1911 for the data verification screen 1900) for history analysis by the transformed-data history management server 160. The data generation time list displays, as a list of generation times of the data, the starting time of the process to be analyzed acquired from the data generation time table 177 (in the case of the data verification screen 1900, the time of starting the execution of "process 1" for generating "data A" acquired from the data generation time table 177 shown in FIG. 15).

Upon operation of the "analysis execution" button 1934, the data to be verified, the determination indicator for analysis corresponding to the "indicator switch" check box 1931 and the generation time of the data selected by the "data generation time" list 1932 are transmitted to the user request receiving unit 111 of the client 110. The user request receiving unit 111 transmits a data verification screen display request to the transformed-data history generating unit 161 of the transformed-data history management server 160.

Assume, for example, that the user selects all of "data value", "number of events processed", "processing time" and "number of times executed" in the "indicator switch" check box 1931 and "2006/7/20 23:00" in the "data generation time" list 1932 while at the same time operating the "analysis execution" button 1934. The system transmits these conditions to the user request receiving unit 111 of the client 110. The user request receiving unit 111, which executes the operation described later, receives these conditions selected by the user. Consequently, the analysis in keeping with the viewpoint of the user can be executed and the analysis result thereof can be displayed on the data verification screen.

An explanation is made again with reference to FIG. 17. In the case where the call on the data verification screen is not the first one (NO in 1702), the transformed-data history generating unit 161 receives the data to be verified, the determination indicator and the generation time selected by the user and the select process from the user request receiving unit 111 of the client 110 (1707). Next, the transformed-data history generating unit 161 acquires the block ID to be analyzed from the data generation time table 177 based on the generation time of the data to be verified received from the user request receiving unit 111 (1708).

Then, the transformed-data history generating unit 161 executes the history analysis of the data to be verified, with the history analysis unit 172 (1709). Further, the data verification screen including the analyzed transformed-data history is displayed by executing the transformed-data history plotting unit 176 (1706). The operation of the history analysis unit 172 executed by the transformed-data history generating unit 161 is explained below.

Figure 20:
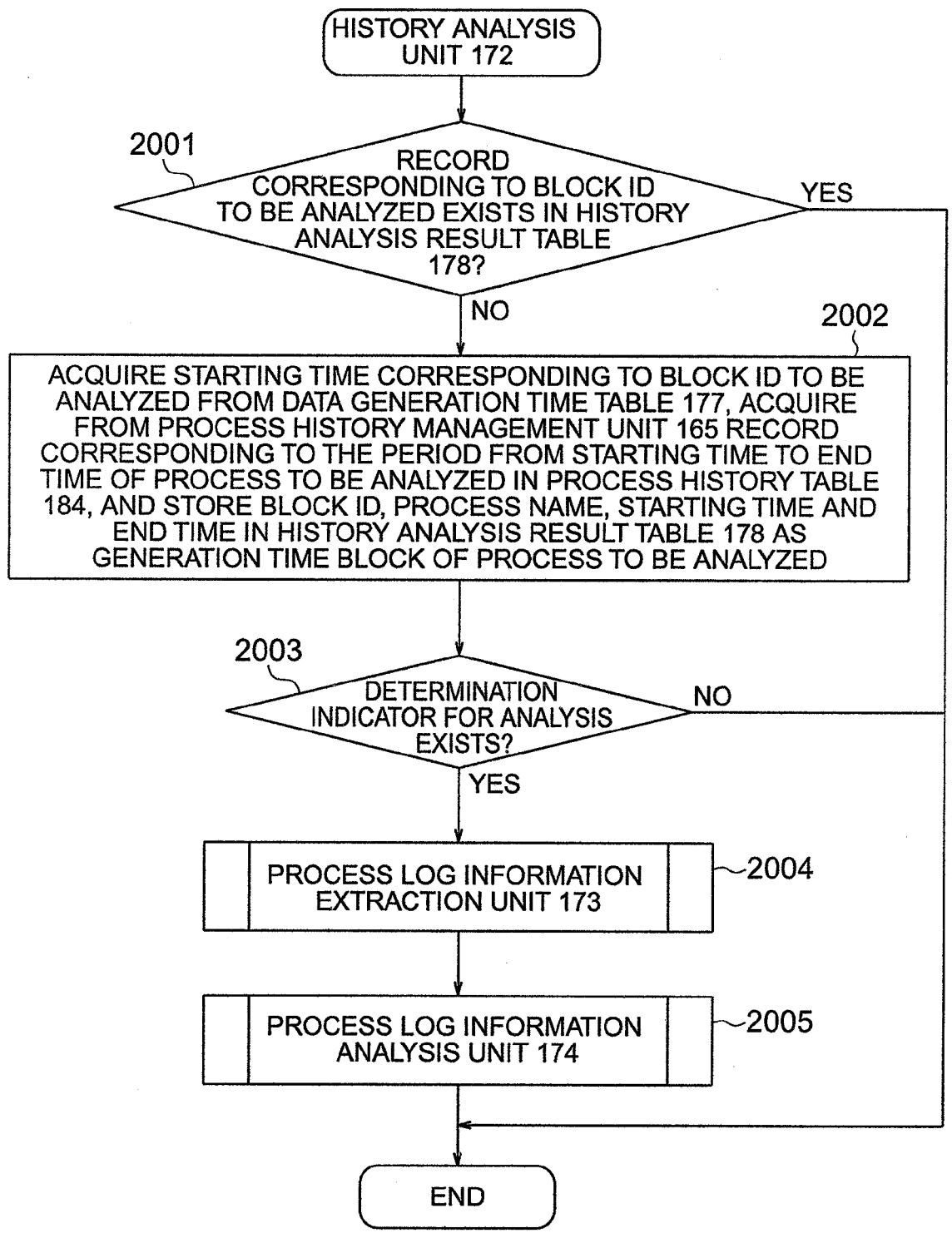
FIG. 20 is a flowchart showing the processing steps of the history analysis unit for analyzing the history of the process execution by the transformed-data history generating unit according to an embodiment of the invention.

FIG. 20 is a flowchart showing the processing steps of the history analysis unit 172 for analyzing the history of the process execution by the transformed-data history generating unit 161 according to an embodiment of the invention. The history analysis unit 172 analyzes whether the process execution is anomalous or not from the result of anomaly determination at the time of process execution and the process execution history.

The history analysis unit 172 confirms whether the record corresponding to the block ID to be analyzed is stored or not in the history analysis result table 178 (2001). In the case where the record corresponding to the ID block is so stored (YES in 2001), the history analysis has already been completed in the generation time block corresponding to the particular block ID, and therefore, the operation is terminated.

In the absence of the record corresponding to the block ID (NO in 2001), the history analysis unit 172 analyzes the history of the block ID to be analyzed. The history analysis unit 172 first acquires the starting time corresponding to the block ID to be analyzed, from the data generation time table 177, and by giving a request to the process history management unit 165, acquires the record corresponding to the period from the starting time to the end time of the process to be analyzed from the process history table 184, as a generation time block of the process to be analyzed. Further, the block ID, the process name, the starting time and the end time acquired are stored in the history analysis result table 178 (2002). Incidentally, as of the time of the operation of 2002, the value of the determination result 1605 of the record inserted in the history analysis result table 178 is regarded as "no problem" and the determination indicator is left vacant.

Then, the history analysis unit 172 confirms whether the determination indicator for analysis received from the user request receiving unit 111 of the client 110 exists or not (2003). In the presence of the determination indicator (YES in 2003), the operation of the process log information extraction unit 173 is executed (2004), and further, the operation of the process log information analysis unit 174 is carried out (2005). The operation of the process log information extraction unit 173 is explained in detail later with reference to FIG. 21. Also, the operation of the process log information analysis unit 174 is explained in detail later with reference to FIG. 22. In the absence of the determination indicator (NO in 2003), on the other hand, the operation of the history analysis unit 172 is ended. Also, upon completion of the operation of 2005, the operation of the history analysis unit 172 is terminated.

Figure 21:
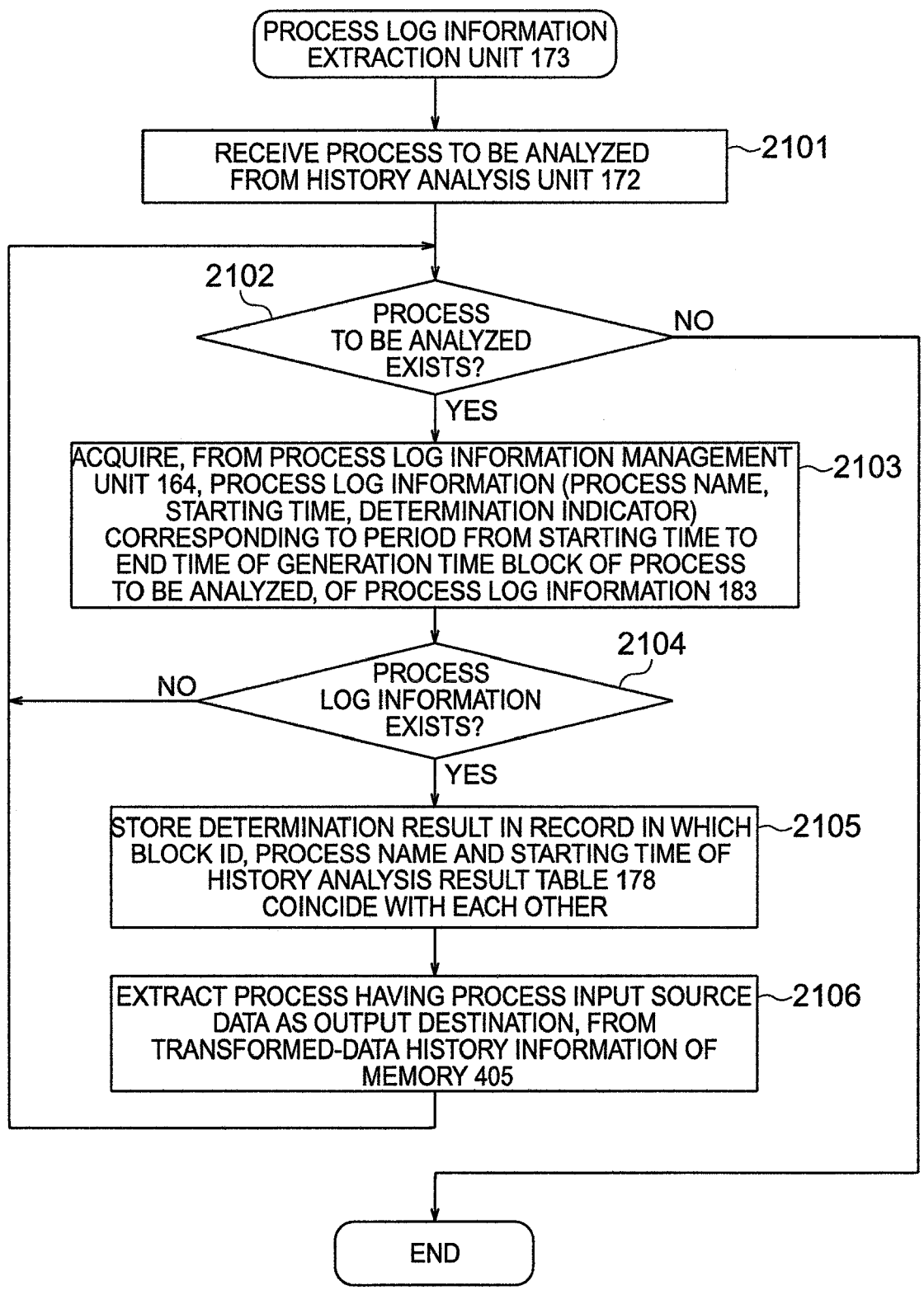
FIG. 21 is a flowchart showing the processing steps of the operation of a process log information extraction unit for extracting the result of the determining operation at the time of the process execution activated by the history analysis unit according to an embodiment of the invention.

FIG. 21 is a flowchart showing the processing steps of the process log information extraction unit 173 for extracting the result of the determining operation at the time of process execution started by the history analysis unit 172 according to an embodiment of the invention.

The process log information extraction unit 173 receives the process to be analyzed from the history analysis unit 172 (2101). Next, the process log information extraction unit 173 determines whether the process to be analyzed which is not yet executed exists or not (2102). In the case where all the processes to be analyzed have not yet been completely executed (YES in 2102), a request is given to the process log information management unit 164 thereby to acquire the process name, the starting time and the determination indicator of the process to be analyzed from the process log information 183 (2103). Upon complete execution of all the processes to be analyzed (NO in 2102), on the other hand, the operation of the process log information extraction unit 173 is ended.

The process log information extraction unit 173, upon completion of the operation of 2103 in the presence of the process log information (YES in 2104), stores the determination result in the record having the process name and the starting time coincident with those of the history analysis result table 178 (2105). In the absence of the process log information (NO in 2104), on the other hand, the control returns to 2102.

The process log information extraction unit 173, upon completion of the operation of 2105, extracts, as a process to be analyzed, the process having the input source data of the process as an output destination from the transformed-data history information recorded in the memory 405 (2106). The process log information extraction unit 173 repeats the steps of 2102 to 2106 until all the processes to be analyzed are completely executed.

In the case where the process to be analyzed is "process 1" and the acquired process log information includes the record 804 of the process log information 183 shown in FIG. 8, for example, the process log information extraction unit 173 stores the determination result in the record 1607 of the history analysis result table 178 shown in FIG. 16. Since the determination indicator of the record 804 of the process log information 183 is "data value", the determination result 1605 stored is "an anomaly has been detected in the data value", so that the determination indicator 1606 becomes "data value". As for the process for which no anomaly is detected, on the other hand, as described above, the determination result 1605 is already "no problem", and the determination indicator 1606 is vacant.

The history analysis result table 178 generated by the process log information extraction unit 173 is a combination of the process execution history (process history table 184) and the anomaly determination result at the time of process execution (process log information 183). Further, after the execution of the operation of the process log information extraction unit 173, the transformed-data history is analyzed in more detail by the operation of the process log information analysis unit 174, and the record determined as anomalous by the determination result of the history analysis result table 178 is analyzed as to whether it is truly anomalous or not.

Figure 22:
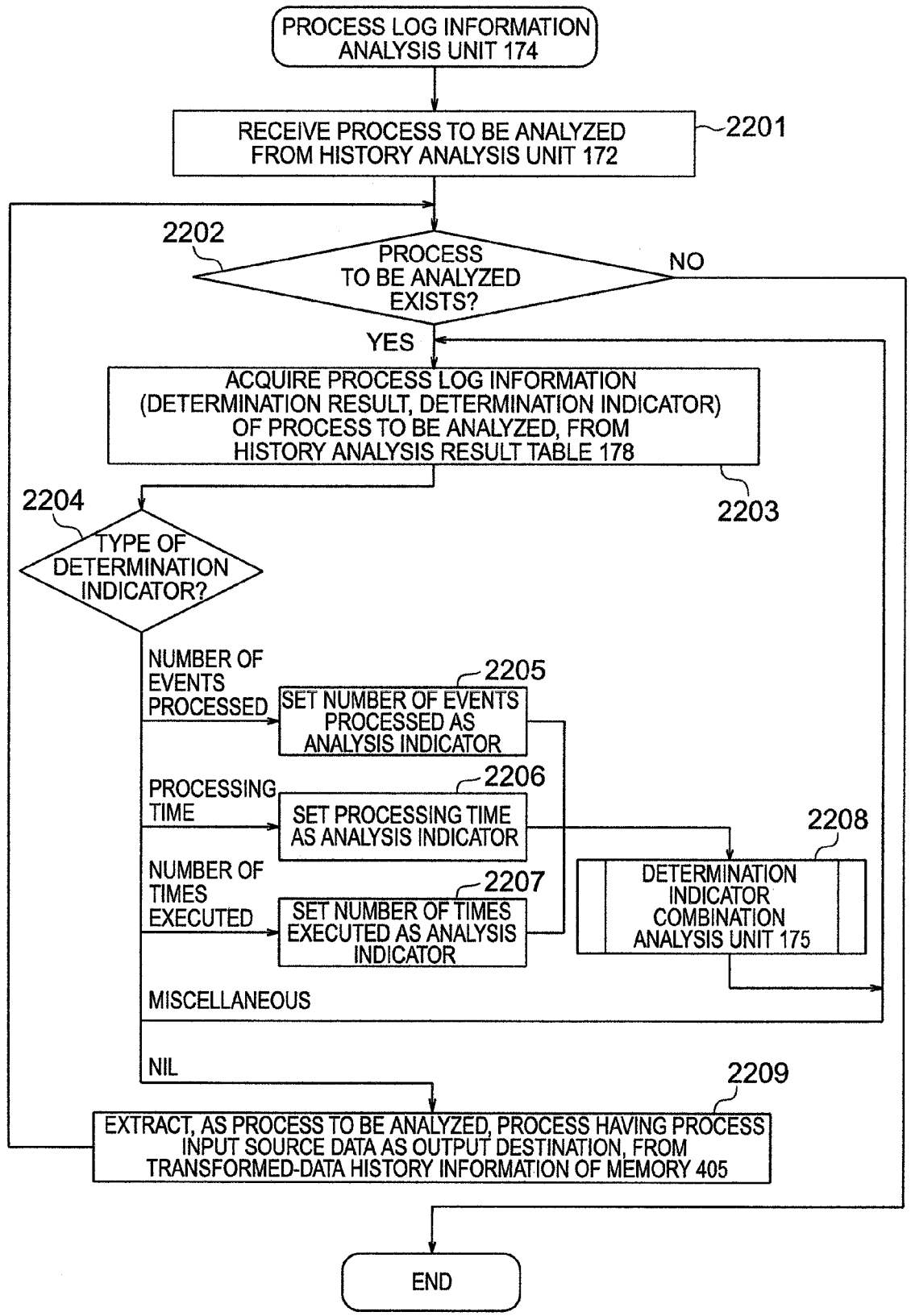
FIG. 22 is a flowchart showing the processing steps of a process log information analysis unit for an anomaly analysis using the determination result at the time of the process execution activated by the history analysis unit and the process execution history according to an embodiment of the invention.

FIG. 22 is a flowchart showing the processing steps of the process log information analysis unit 174 for analyzing the anomaly probability using the determination result at the time of process execution started by the history analysis unit 172 and the process execution history according to an embodiment of the invention.

Next, the process log information analysis unit 174 receives the process to be analyzed from the history analysis unit 172 (2201). Then, it is determined whether the process to be analyzed which is not yet completely executed exists or not (2202).

In the case where all the processes to be analyzed are not completely executed (YES in 2202), the process log information analysis unit 174 acquires the determination result and the determination indicator as the process log information of the process to be analyzed from the history analysis result table 178 (2203). In the case where all the processes to be analyzed are completely executed (NO in 2202), on the other hand, the operation of the process log information analysis unit 174 is terminated.

The process log information analysis unit 174, upon completion of the step 2203, sets the analysis indicator based on the type of the acquired determination indicator. In the case where the determination indicator is the "number of events processed" (hereinafter sometimes referred to as the processed event number) in the step 2204, the analysis indicator is set to the processed event number (2205). In similar fashion, in the case where the determination indicator is the "processing time", the analysis indicator is set to the processing time (2206), and in the case where the determination indicator is the "number of times executed" (hereinafter sometimes referred to as the execution number), the analysis indicator is set to the execution number (2207). In each case, the analysis with combination of determination indicators (hereinafter sometimes referred to as the determination indicator combination analysis) is executed by the determination indicator combination analysis unit 175 (2208). Upon complete execution of the determination indicator combination analysis unit 175, the determination indicator combination analysis unit 175 returns to the operation of 2203. The operation of the determination indicator combination analysis unit 175 is described in detail later with reference to FIG. 23.

Incidentally, in the case where the determination indicator is "miscellaneous" in the operation of 2204, the control returns to 2203. According to an embodiment of the invention, this corresponds to the case where the determination indicator is "data value". Also, in the case where no value is set in the determination indicator, the determination indicator combination analysis unit 175 extracts a process having an input source data as an output destination, as a new process to be analyzed, from the transformed-data history information recorded in the memory 405 (2209), and then the control returns to 2202. In the case where no value is set in the determination indicator, it indicates, for example, that the process has been normally executed.

Figure 23:
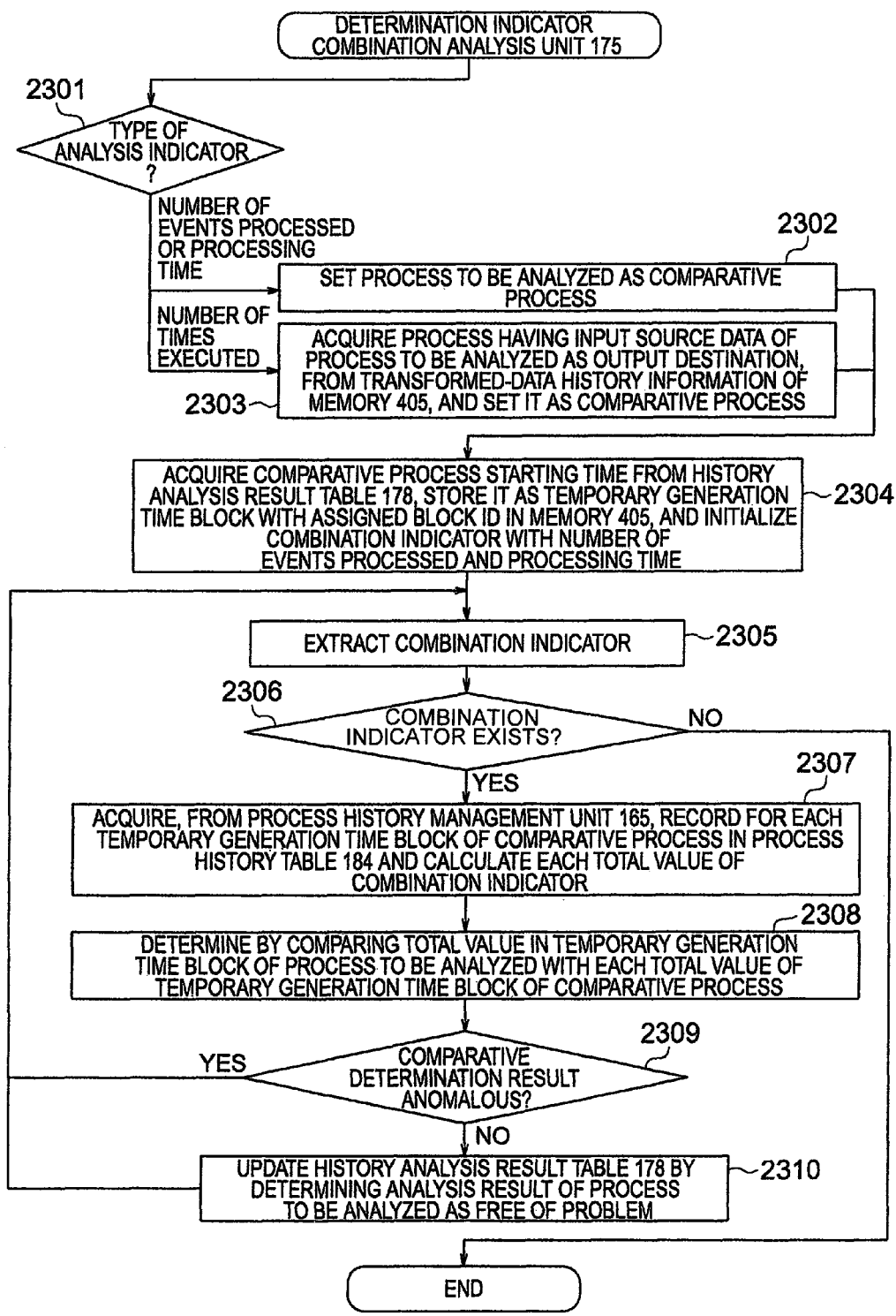
FIG. 23 is a flowchart showing the processing steps of the unit for analysis with combination of determination indicators (hereinafter sometimes referred to as the determination indicator combination analysis unit) activated by the process log information analysis unit for conducting the anomaly analysis in combination with other determination indicators in accordance with the analysis determination indicator.

FIG. 23 is a flowchart showing the processing steps of the determination indicator combination analysis unit 175 activated by the process log information analysis unit 174 according to an embodiment of the invention for analyzing whether a combination with other determination indicators is anomalous or not in accordance with the analysis determination indicator.

The determination indicator combination analysis unit 175 sets a comparative process for combining and analyzing the types of the analysis indicators set by the process log information analysis unit 174. In the operation of 2301, in the case where the type of the analysis indicator is "processed event number or processing time", the process to be analyzed is set as a comparative process (2302). Also, in the case where the type of the determination indicator is "execution number", the process is acquired with the input source data of the process to be analyzed as an output destination based on the transformed-data history information, and the acquired process is set as a comparative process (2303). Incidentally, the comparative process is defined as a process compared by a combination indicator constituting another determination indicator analyzed in combination with the determination indicator of the process to be analyzed.

The determination indicator combination analysis unit 175, upon completion of the operation of 2302 or 2303, acquires the starting time of the comparative process from the history analysis result table 178, and by assigning the block ID as a temporary generation time block of the comparative process, stores it in a memory. Then, the combination indicator is initialized by the processed event number and the processing time (2304).

The determination indicator combination analysis unit 175 extracts the combination indicator not yet completely analyzed (2305). In the case where the combination indicator not yet completely analyzed remains (YES in 2306), a request is given to the process history management unit 165 to acquire the record for each temporary generation time block for the comparative process from the process history table 184 thereby to calculate each total value of the combination indicator (2307). Then, the determination indicator combination analysis unit 175 compares the total value in the temporary generation time block of the process to be analyzed with the calculated total value for each temporary generation time block of the comparative process (2308).

Incidentally, upon complete analysis of all the combination indicators (NO in 2306), the operation of the determination indicator combination analysis unit 175 is terminated.

Upon completion of the process of 2308, the determination indicator combination analysis unit 175 confirms whether the process execution is anomalous or not from the result of comparative determination (2309). In the case where the result of comparative determination is normal (NO in 2309), the analysis result of the process to be analyzed is regarded as free of any problems and the history analysis result table 178 is updated, followed by returning to the operation of 2305 (2310). In the case where the result of comparative determination is anomalous (YES in 2309), on the other hand, the control returns to 2305.

Specifically, in the operation shown in FIGS. 22 and 23, assume that the process is "process 2", for example. The record 1609 is acquired as the process log information from the history analysis result table 178 by the operation of 2203 shown in FIG. 22. Since the determination indicator is "processed event number", the operation of 2205 is executed, and the operation of the determination indicator combination analysis unit 175 is executed in the step of 2208.

In this case, the type of the analysis indicator in the operation of 2301 shown in FIG. 23 is "processed event number", and therefore, the operation of 2302 is executed, and the process to be analyzed is set as the comparative process. At the same time, the total value of the processed event number for each temporary generation time block of the comparative process is determined by comparison in the operation of 2304 to 2309 of the determination indicator combination analysis unit 175. In the case where the total value of the generation time block 607 in FIG. 6B is 430 and the total value of the processed event number of the generation time block 608 is 400, for example, the result of process execution is not determined as anomalous in the comparative determination of the total value of the processed event number for each temporary generation time block. In such a case, although the determination result of process execution is that the processed event number is anomalous, the record 1609 of the history analysis result table 178 of the process to be analyzed is determined as normal. Then, the determination result 1605 is given as "no problem" and the determination indicator 1606 is updated as a vacant state.

Now, a specific example is explained. Consider, as an example, the data on the quantity of a commodity 0X ordered in a certain convenience store. Assume that the commodity 0X is ordered arbitrarily and the totalization operation by process execution of the stock list is executed every night. Also, assume that each ordered quantity is calculated by the process of totalizing the ordered quantities.

Assume that the commodity 0X is ordered three times for 500, 600 and 600 units on the first day, two times for 1500 and 100 on the second day, and three times for 1500, 1500 and 600 on the third day. Also, assume that the totalization operation is executed after all the order process is completely executed.

Also, assume that in the case where the data value of each order process is the ordered quantity, a value deviated from a threshold value (the range between maximum of 1000 units and minimum of 300 units, for example) is determined as anomalous. Thus, the order for 1500 and 100 units on the second day and the two orders for 1500 units on the third day are each determined as anomalous as an individual order.

In this case, the process execution detected as anomalous at the time of analysis is compared with the average total value of the processed event number per unit time (temporary generation time block) for which the other process executions in the history are totalized thereby to determine an anomaly or no anomaly. Also, assume that the threshold value is not more than 1.9 in ratio of between the average value of the total and the total value detected as anomalous.

Take the aforementioned order for the commodity 0X as an example. The total quantities ordered on the second day can be determined as not anomalous in view of the fact that the data per unit time (1600 units per day) in terms of the average (1700 units per day) of the total value per unit time for the first day is in the range of the threshold value (ratio of 1.9). In other words, the order for 1500 units and 100 units on the second day can be determined as not anomalous.

The data for the third day (3600 units per day), on the other hand, exceeds the range of the threshold value for the average (1650 units per day) up to the second day, and therefore, can be determined as anomalous.

As described above, by executing the operation shown in FIGS. 22 and 23, an anomaly or a normality can be analyzed in more detail by combining the determination result as to whether the process execution is anomalous or not with another determination indicator or the result of the preceding or subsequent process execution.

The history analysis result table 178 analyzed in more detail by the process log information analysis unit 174 is used to acquire the number of anomalous events displayed in the column under each process in the transformed-data history unit 1901 on the data verification screen 1900. Incidentally, in the transformed-data history unit 1901 in the state not analyzed, the column is vacant as shown by 1913 in FIG. 19.

The history analysis result table 178 is also used for acquiring the information on the analysis result displayed in the analysis result unit 1902 about the process selected by the transformed-data history unit 1901. Incidentally, in the data verification screen 1900 of the process to be analyzed and not yet analyzed, as shown in FIG. 19, nothing is displayed on the analysis result unit 1902.

Figure 24:
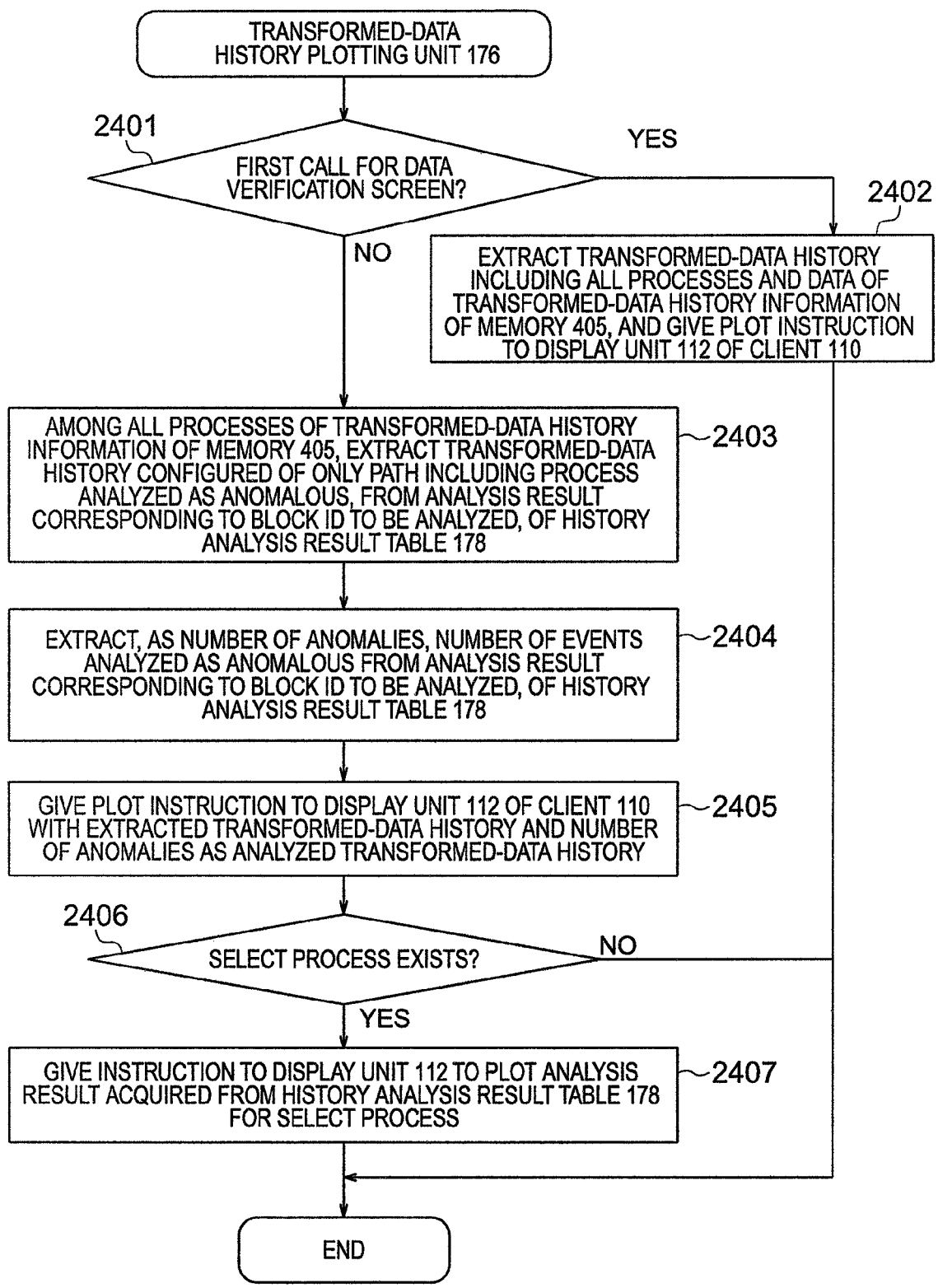
FIG. 24 is a flowchart showing the processing steps of the operation of a transformed-data history plotting unit activated by the transformed-data history generating unit for instructing the client to plot the data verification screen according to an embodiment of the invention.

FIG. 24 is a flowchart showing the processing steps of the transformed-data history plotting unit 176 activated by the transformed-data history generating unit 161 according to an embodiment of the invention to instruct the client 110 to plot the data verification screen.

The transformed-data history plotting unit 176 first confirms whether the call for the data verification screen is the first one or not (2401). In the case of the first call (YES in 2401), the transformed-data history configured of all the processes and data of the transformed-data history information recorded in the memory 405 are extracted, and a plotting instruction is given to the display unit 112 of the client 110 (2402) thereby to end the operation. At the same time, the data verification screen instructed to plot constitutes the data verification screen 1900 shown in FIG. 19.

In the case where the call is not the first one (NO in 2401), on the other hand, the transformed-data history plotting unit 176 extracts the transformed-data history configured of only the path including the process analyzed as anomalous from the analysis result corresponding to the block ID to be analyzed, of the history analysis result table 178 among the transformed-data history information recorded in the memory 405 (2403).

Further, the transformed-data history plotting unit 176 extracts the number of events analyzed as anomalous as the number of anomalous events based on the analysis result corresponding to the block ID to be analyzed, of the history analysis result table 178 (2404).

Then, the transformed-data history plotting unit 176 transmits an instruction to the display unit 112 of the client 110 to plot, as an analyzed transformed-data history, the extracted transformed-data history and the number of anomalous events (2405).

Next, the transformed-data history plotting unit 176 confirms whether the select process received from the user request receiving unit 111 of the client 110 exists or not (2406). In the presence of the select process (YES in 2406), the transformed-data history plotting unit 176 transmits an instruction to the display unit 112 of the client 110 to plot the analysis result acquired from the history analysis result table 178 about the select process (2407). In the absence of the select process (NO in 2406), on the other hand, the operation of the transformed-data history plotting unit 176 is ended.

Next, an explanation is given about the data verification screen which the transformed-data history plotting unit 176 has instructed the display unit of the client 110 to plot in other than the first call of the data verification screen.

FIG. 25 is a diagram showing the data verification screen 1900 according to an embodiment of the invention.

The data verification screen 1900 is the screen displayed on the display device 206 through the display control device 205 as the result of the display unit 112 of the client 110 receiving the plotting instruction transmitted from the transformed-data history plotting unit 176.

The data verification screen 1900 is configured of a transformed-data history unit 1901 for displaying the analyzed transformed-data history, an analysis result unit 1902 and an analysis condition setting unit 1903.

The transformed-data history unit 1901 displays the information on the analyzed transformed-data history which is analyzed by the transformed-data history management server 160 and which includes only the extracted path having the process related to an anomaly. In the case of the transformed-data history unit 1901 shown in FIG. 25, for example, the process analyzed as anomalous by the determination result 1605 of the history analysis result table 178 shown in FIG. 16 and the number of anomalous events for the particular process are extracted, and the analyzed transformed-data information including only the extracted process are displayed among the transformed-data history information recorded in the memory 405.

Then, the transformed-data history unit 1901 displays the relation in the form of a hierarchical structure between the data related to an anomaly (for example, "data A" 2511) and the process (for example, "process 1" 2512). The analyzed transformed-data history, therefore, represents the relation in the form of a hierarchical structure configured of a path including only "data A" 2511 at the extreme left as a root node and the processes including "process 1", "process 2", "process 3" and "process 4" analyzed as anomalous from "data A".

Also, each process displayed includes the process name ("process 1" 2512 for the analyzed transformed-data history unit 1901) at the upper part and the extracted anomalous event number ("anomalies: one" 2513 for the analyzed transformed-data history unit 1901) at the lower part. Specifically, the processes related to an anomaly include one anomalous event for "process 1", seven anomalous events for "process 2", ten anomalous events for "process 3" and three anomalous events for "process 4".

Incidentally, "process 2" 2514 is in a selected state, indicating that the analysis result thereof is displayed on the analysis result unit 1902.

As described above, the analyzed transformed-data history unit 1901, unlike the transformed-data history unit 1901 shown in FIG. 19, displays only the process related to an anomaly without displaying the transformed-data history of all the processes executed to generate "data A".

By displaying the analyzed transformed-data history unit 1901, therefore, the user can recognize what is the process related to an anomaly and the number of events analyzed as anomalous in the execution history of each process, thereby making it possible to determine the process to be verified.

In the case where the process (for example, 2512 or 2514) of the analyzed transformed-data history unit 1901 is selected, the analysis result unit 1902 displays the analysis result of the particular process. As shown in FIG. 25, the analyzed transformed-data history unit 1901 has selected "process 2" 2514 and the analysis result unit 1902 displays the analysis result of the process 2.

Specifically, the analysis result unit 1902 indicates a particular process of which the analysis result is on display (2521) and displays an analysis result list 2522. The analysis result list 2522 is displayed in the form of a table including the columns of the starting time 2523, the end time 2524 and the analysis result 2525. Each column displays the information acquired from the history analysis result table 178 by the operation of 2407 of the transformed-data history plotting unit 176 shown in FIG. 24. As compared with the columns of the history analysis result table 178, the starting time 1603 corresponds to the starting time 2523, the end time 1604 to the end time 2524 and the determination result 1605 to the analysis result 2525. In the record 2526 of the analysis result list 2522, for example, the result of analysis of the process 2 of which the execution is started at "2006/7/20 22:00" and ended at "2006/7/20 22:50" is displayed as "no problem", thereby indicating that no anomaly is extracted.

In the record 2527 of the analysis result list 2522, on the other hand, the result of the analysis of the process 2 of which the execution is started at "2006/7/20 21:30" and ended at "2006/7/20 22:00" is displayed as "data value anomaly detected". In other words, the anomaly extraction is indicated in this process as the result of analyzing the data value to the determination indicator.

The "anomalies: 7" displayed under "process 2" 2514 of the analyzed transformed-data history unit 1901 indicates the number of records in which an anomaly is extracted, such as the record 2527 of the analysis result list 2522.

By displaying the analysis result unit 1902 of each process in this way, the user can determine and verify the time of execution of a particular process which has developed an anomaly, among the processes related to the anomaly.

The analysis condition setting unit 1903 is similar to the analysis condition setting unit 1903 shown in FIG. 19. Upon operation of the "analysis execution" button 1934 in the analysis condition setting unit 1903 shown in FIG. 25, the client 110 transmits, to the user request receiving unit 111, by setting the determination indicators as "data value", "processed event number", "processing time" and "execution number" and the data generation time to be analyzed as "2006/7/20 23:00".

According to an embodiment of the invention, the determination indicators and the generation time constituting the analysis conditions are designated, and based on the accumulated history information and the process log information making up the information on the process having a high anomaly probability determined at the time of process execution, the data to be verified is analyzed. Then, the transformed-data history and the execution history of only the process related to an anomaly are extracted and displayed on the data verification screen.

The data verification screen displays the screen of the transformed-data history having extracted only the processes related to an anomaly, and therefore, the user can grasp a particular process related to an anomaly and the number of events of each process analyzed as anomalous and determine a particular process of which the data is to be verified. Also, the data verification screen displays the analysis result for the execution history of each process, and therefore, the user can specify the time when the process that has developed an anomaly is executed, thereby facilitating the determination of the process to be verified. Further, the data verification screen displays an analysis condition setting screen on which the analysis conditions can be set, and therefore, the analyzed verification result can be displayed in accordance with the viewpoint of each user.

According to an embodiment of the invention, therefore, the system supports, through the data verification screen generated, the user in determining the process related to an anomaly and the determining the execution time of the process causing the anomaly, thereby reducing the working time for the data verification work.

According to an embodiment of the invention, the four determination indicators including "data value", "number of events processed", "processing time" and "number of times executed" are defined beforehand in a system by the execution time determining unit 122 of the process server 120 and the history analysis unit 172 of the transformed-data history management server 160. In the data verification aiding system, other determination indicators can be added to the system as a plug-in.

The determination indicator added, may be the "data size", for example, of the data generated. Specifically, in the operation of 1102 shown in FIG. 11, the "data size" may be added as a determination indicator to be initialized to the execution time determining unit 122 of the process server 120. Also, the "data size" may be set as an analysis indicator at the branch based on the type of the determination indicator of the operation 2204 of FIG. 22 by the process log information analysis unit 174 of the transformed-data history management server 160, and the plug-in that can be analyzed in combination with the "data size" in the operation of 2301 of the determination indicator combination analysis unit 175.

According to an embodiment of the invention, the anomaly determination at the time of process execution is carried out by the anomaly determining operation 1105 based on the threshold value and the anomaly determining operation 1106 based on the statistical process. Nevertheless, the determining operation other than the aforementioned two types can be added as a plug-in.

For example, a plug-in with a knowledge base connected anew to the system configuration shown in FIG. 1 for determination using the determination indicator "reliability" by the rule base and the estimation engine can be added to the execution time determining unit 122.

According to an embodiment of the invention, the anomaly determining operation at the time of process execution by the execution time determining unit 122 of the process server 120 can be used uniformly for business data of a variety of types. The determining operation depending on a specified business data can be also executed by using the determination result as an analysis indicator in the operation of the history analysis unit 172 of the transformed-data history management server 160. In this case, the requirement is met by adding a plug-in for the determining operations dependent on a specified business data to the execution time determining unit 122.

According to an embodiment of the invention, the process execution is analyzed by the process log information extraction unit 173 and the process log information analysis unit 174 in the history analysis unit 172 of the transformed-data history management server 160. Nevertheless, an analysis method using a combination of the history information and the process log information recorded at the time of process execution may be added as a plug-in to the history analysis unit 172. By adding the plug-in, the process related to an anomaly can be extracted in a way more suitable for the data to be verified.

Taking the relation between the preceding and subsequent process execution into consideration, for example, assume that the process execution to be analyzed is not determined as anomalous but both the processes executed before and after the generation time block are anomalous. Then, the anomaly probability may be determined as high and an analysis process plug-in for anomaly determination may be added. Also, in the field where the pattern of an anomalous process execution is known in advance, an analysis process plug-in for comparing with a pattern and extracting an anomalous process execution can be added.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing method for analyzing process execution in a data analysis apparatus, wherein the data analysis apparatus includes a processor and a storage device accessible by the processor, the data processing method comprising:
   executing one process of a plurality of processes by the processor, said one process reading at least one input data and outputting at least one output data;
   recording a process execution history and process log information in the storage device; and
   generating process history analysis information based on the process execution history and the process log information stored in the storage device,
   wherein said process log information is generated by the following steps, comprising:
   storing, in the storage device, a threshold value of the output data,
   determining whether the process execution is abnormal or not each time the process is executed, based on comparing a value of the output data outputted by the process with the threshold value of the output data stored in the storage device, and
   upon a determination that the process execution is abnormal, recording the process log information of the process execution,
   wherein said process history analysis information is generated by the following steps, comprising:
   generating a data generation time block based on acquiring the records stored in the process execution history corresponding to a period from a starting time of at least one process, the output of which is input to the process to be analyzed, to an end of time of the process to be analyzed,
   storing the data generation time block into the process history analysis information, and
   determining whether the process to be analyzed in the process history analysis information is stored in the process log information, and if the process to be analyzed in the process history analysis information is stored in the process log information, storing "abnormal" instead of "normal" as the determination result in the process history analysis information, and if the process to be analyzed in the process history analysis information is not stored in the process log information, doing nothing,
   wherein the process history analysis information is generated based on the data generation time block, with the combination of the process execution history and the process log information,
   wherein the process execution history in the data generation time block is analyzed using a combination indicator which is an average of indicators of other data generation time blocks, and if the process execution in the data generation time block is determined to be "normal" in accordance with the combination indicator, the information on the process to be analyzed in the process history analysis information is updated to "normal",
   wherein the plurality of processes are related by a hierarchical connection to each other and data processed and output by upper ones of the plural processes is input to lower ones of the plural processes,
   wherein the process history analysis information is generated by extracting information relating to a specific output data identified by a block ID from the process execution history and the process log information, and
   wherein information of executions of plural processes relating to the block ID stored in the process history information is analyzed using a combination indicator to make an analysis result.

2. A data analysis apparatus for analyzing a process execution, comprising:
   a processor; and
   a storage device accessible by the processor,
   wherein the processor performs a data processing method comprising:
   executing one process of a plurality of processes, said one process reading at least one input data and outputting at least one output data;
   recording a process execution history and process log information in the storage device; and
   generating process history analysis information based on the process execution history and the process log information stored in the storage device,
   wherein said process log information is generated by the following steps, comprising:
   storing, in the storage device, a threshold value of the output data,
   determining whether the process execution is abnormal or not each time the process is executed, based on comparing a value of the output data outputted by the process with the threshold value of the output data stored in the storage device, and
   upon a determination that the process execution is abnormal, recording the process log information of the process execution,
   wherein said process history analysis information is generated by the following steps, comprising:
   generating a data generation time block based on acquiring the records stored in the process execution history corresponding to a period from a starting time of at least one process, the output of which is input to the process to be analyzed, to an end of time of the process to be analyzed,
   storing the data generation time block into the process history analysis information, and determining whether the process to be analyzed in the process history analysis information is stored in the process log information, and if the process to be analyzed in the process history analysis information is stored in the process log information, storing "abnormal" instead of "normal" as the determination result in the process history analysis information, and if the process to be analyzed in the process history analysis information is not stored in the process log information, doing nothing, wherein the process history analysis information is generated based on the data generation time block, with the combination of the process execution history and the process log information, wherein the process execution history in the data generation time block is analyzed using a combination indicator which is an average of indicators of other data generation time blocks, and if the process execution in the data generation time block is determined to be "normal" in accordance with the combination indicator, the information on the process to be analyzed in the process history analysis information is updated to "normal", wherein the plurality of processes are related by a hierarchical connection to each other and data processed and output by upper ones of the plural processes is input to lower ones of the plural processes, wherein the process history analysis information is generated by extracting information relating to a specific output data identified by a block ID from the process execution history and the process log information, and wherein information of executions of plural processes relating to the block ID stored in the process history information is analyzed using a combination indicator to make an analysis result.

3. The data processing method according to claim 1, wherein the hierarchical connection among the plural processes is defined by a process step table.

4. The data processing method according to claim 1, wherein a process execution relating to the block ID is identified by the data generation time block.

5. The data analysis apparatus according to claim 2, wherein the hierarchical connection among the plural processes is defined by a process step table.

6. The data analysis apparatus according to claim 2, wherein a process execution relating to the block ID is identified by the data generation time block.

* * * * *